(12) United States Patent
Matsunaga et al.

(10) Patent No.: US 10,005,441 B2
(45) Date of Patent: Jun. 26, 2018

(54) ELECTRIC BOOSTER

(71) Applicant: HITACHI AUTOMOTIVE SYSTEMS, LTD., Ibaraki (JP)

(72) Inventors: Kunihiro Matsunaga, MinamiALPS (JP); Mitsuhiro Endo, MinamiALPS (JP); Satohiro Koi, Chuo (JP); Naoki Shirakawa, Kofu (JP); Atsushi Odaira, Yokohama (JP); Takuya Usui, Yokohami (JP); Hiroshi Shigeta, Atsugi (JP)

(73) Assignee: HITACHI AUTOMOTIVE SYSTEMS, LTD., Ibaraki (JP)

( * ) Notice: Subject to any disclaimer, the term of this patent is extended or adjusted under 35 U.S.C. 154(b) by 166 days.

(21) Appl. No.: 14/777,980

(22) PCT Filed: Mar. 31, 2014

(86) PCT No.: PCT/JP2014/059582
§ 371 (c)(1),
(2) Date: Sep. 17, 2015

(87) PCT Pub. No.: WO2014/178253
PCT Pub. Date: Nov. 6, 2014

(65) Prior Publication Data
US 2016/0068146 A1 Mar. 10, 2016

(30) Foreign Application Priority Data

Apr. 30, 2013 (JP) .................................. 2013-095393
Dec. 24, 2013 (JP) .................................. 2013-265703

(51) Int. Cl.
*B60T 13/74* (2006.01)
*B60T 1/10* (2006.01)
*B60T 13/66* (2006.01)

(52) U.S. Cl.
CPC .............. *B60T 13/745* (2013.01); *B60T 1/10* (2013.01); *B60T 13/662* (2013.01); *B60T 2270/604* (2013.01)

(58) Field of Classification Search
CPC . B60T 1/10; B60T 8/17; B60T 13/662; B60T 13/745; B60T 13/74; B60T 13/52; B60T 13/58
(Continued)

(56) References Cited

U.S. PATENT DOCUMENTS 9,061,673 B2 * 6/2015 Weiberle ............... B60T 13/745
9,845,086 B2 * 12/2017 Mahnkopf ............. B60T 13/58
(Continued)

FOREIGN PATENT DOCUMENTS

CN  101318503  12/2008
EP  2 000 376   12/2008
(Continued)

OTHER PUBLICATIONS

JP 2008081033—English Translation (Translation to English by https://www.j-platpat.inpit.go.jp, retrieved Aug. 2, 2017).*
(Continued)

*Primary Examiner* — Michael Leslie
*Assistant Examiner* — Richard Drake
(74) *Attorney, Agent, or Firm* — Wenderoth, Lind & Ponack, L.L.P.

(57) ABSTRACT

An electric motor is controlled according to the back and forth movement of an input rod, which is caused by brake pedal operation; a primary piston is propelled to generate hydraulic brake pressure in a master cylinder; and the hydraulic brake pressure is fed back to the input rod through an input piston. The input piston is resiliently held by springs with respect to the primary piston. A jump-in clearance is created between the input piston and the input rod by a
(Continued)

rearward spring. At the initial stage of braking, hydraulic brake pressure is not transmitted to the input rod due to the jump-in clearance, which provides jump-in characteristics. The jump-in clearance can be set, regardless of the amount of a relative displacement between the primary piston and the input piston, so that the range of adjustment for regenerative braking can be set larger than the jump-in clearance.

17 Claims, 17 Drawing Sheets

(58) Field of Classification Search
   USPC .......................................................... 60/545
   See application file for complete search history.

(56) References Cited

U.S. PATENT DOCUMENTS

| | | | | |
|---|---|---|---|---|
| 9,868,428 | B2* | 1/2018 | Mahnkopf | .............. B60T 13/52 |
| 2008/0302100 | A1 | 12/2008 | Ohtani et al. | |
| 2010/0275593 | A1* | 11/2010 | Okada | ................... B60T 13/745 |
| | | | | 60/545 |
| 2011/0314806 | A1* | 12/2011 | Ishizuka | ................. B60T 7/042 |
| | | | | 60/545 |
| 2013/0025273 | A1* | 1/2013 | Nozawa | .................. B60T 7/042 |
| | | | | 60/545 |
| 2013/0263588 | A1* | 10/2013 | Yoshimoto | .............. F15B 15/08 |
| | | | | 60/545 |
| 2013/0269337 | A1* | 10/2013 | Mahnkopf | .............. B60T 7/042 |
| | | | | 60/533 |

FOREIGN PATENT DOCUMENTS

| | | |
|---|---|---|
| JP | 2008-81033 | 4/2008 |
| JP | 2008-302725 | 12/2008 |
| JP | 2009-184391 | 8/2009 |
| JP | 2012-179961 | 9/2012 |

OTHER PUBLICATIONS

International Search Report dated Jun. 24, 2014 in International Application No. PCT/JP2014/059582.

* cited by examiner

ELECTRIC BOOSTER

TECHNICAL FIELD

The present invention relates to an electric booster which is incorporated in a brake device for a vehicle such as an automobile and uses an electric actuator to generate hydraulic brake pressure in a master cylinder.

BACKGROUND ART

Aside from negative-pressure boosters using a common negative-pressure actuator as a boost source, an electric booster using an electric motor as a boost source is well known as a booster incorporated in a brake device, for example, as described in Patent Document 1. The electric booster described in the Patent Document 1 includes an input piston which moves back and forth by brake pedal operation, a booster piston mounted on the input piston to be movable relative to the input piston, a rotation-linear motion conversion mechanism which makes the booster piston move back and forth, and an electric motor which applies torque to the rotation-linear motion conversion mechanism. The input thrust applied from the brake pedal through an input rod to the input piston and the booster thrust applied from the electric motor to the booster piston generate hydraulic brake pressure within the pressure chamber of a master cylinder.

According to the electric booster of the Patent Document 1, the input piston, the distal end portion of which is inserted in the master cylinder, is divided in the axial direction. A master-cylinder side segment of the input piston is biased toward the master cylinder by a spring device, and thus creates a clearance between the master-cylinder side segment and a brake-pedal side segment of the input piston when braking is not applied. At the initial stage of braking, therefore, the master-cylinder side segment which is a shaft member is applied with the hydraulic brake pressure of the master cylinder and reduces the clearance to the brake-pedal side segment against the biasing force of the spring device. During this process, the hydraulic brake pressure of the master cylinder is not transmitted to the brake pedal, which provides so-called jump-in characteristics in which output is increased, regardless of input. The electric booster, as with the negative-pressure booster, obtains the jump-in characteristics at the initial stage of braking, quickly creates a braking force, and provides a good brake feeling.

CITATION LIST

Patent Document

Patent Document 1: Japanese Unexamined Patent Application Publication (Kokai) No. 2008-81033

SUMMARY OF INVENTION

Technical Problem

On the other hand, the electric booster of the Patent Document 1 has the following problem. When performing the regenerative braking which drives a generator through wheel rotation and converts kinetic energy into electrical energy to recover the energy at the braking of the vehicle, the electric booster of the Patent Document 1 carries out regenerative coordination control in which the hydraulic brake pressure corresponding to a regenerative braking amount is subtracted from the hydraulic brake pressure generated in the master cylinder by brake pedal operation. In this case, because of the structure of the booster, the regenerative braking amount is limited to the clearance between the segments of the input piston. Recoverable energy therefore cannot be increased by the regenerative braking.

An object of the present invention is to provide an electric booster capable of achieving the jump-in characteristics and gaining a sufficiently large amount of regenerative braking at the time of regenerative braking.

Solution to Problem

To solve the problem, an electric booster according to the invention including a piston, a distal side of which is located inside a master cylinder and forms a compression chamber; an electric actuator which moves the piston; an input piston, a distal end of which is located to face the compression chamber of the master cylinder, the input piston being placed to be axially displaceable relative to the piston; a first spring device that resiliently holds the input piston at a predetermined position in an axial direction of the input piston with respect to the piston; an input member which is placed to be axially displaceable relative to the input piston, further placed to be contactable with the input piston and to face the input piston in an axial direction, the input member being capable of moving back and forth by brake pedal operation; and a second spring device which applies a spring force to the input member in a direction in which the input member is moved away from the input piston, wherein a predetermined clearance is formed between the input piston and the input member by means of the second spring device when the brake pedal is not in operation.

Advantageous Effects of Invention

The electric booster of the invention makes it possible to achieve the jump-in characteristics and increase the amount of regenerative braking at the time of regenerative coordination braking.

BRIEF DESCRIPTION OF DRAWINGS

FIG. 4 is a longitudinal section of the relevant part of the electric booster shown in FIG. 1 during jump-in.

FIG. 10 is a longitudinal section of the relevant part of the electric booster shown in FIG. 8 during jump-in.

DESCRIPTION OF EMBODIMENTS

Embodiments of the invention will be described below with reference to the drawings.

A first embodiment will be first described with reference to FIGS. 1 to 7.

Figure 1:
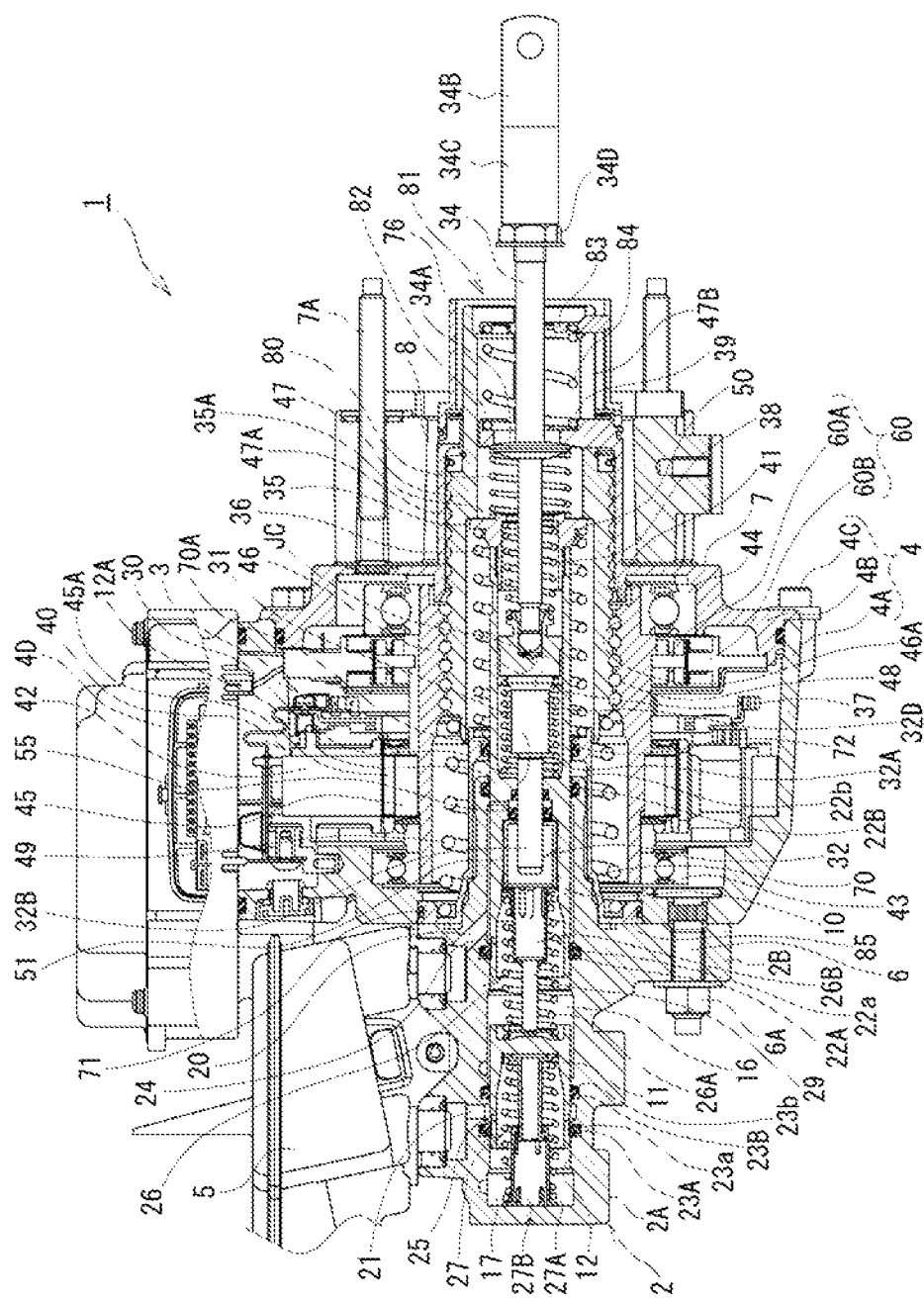
FIG. 1 is a longitudinal section of an electric booster according to a first embodiment.
Figure 2:
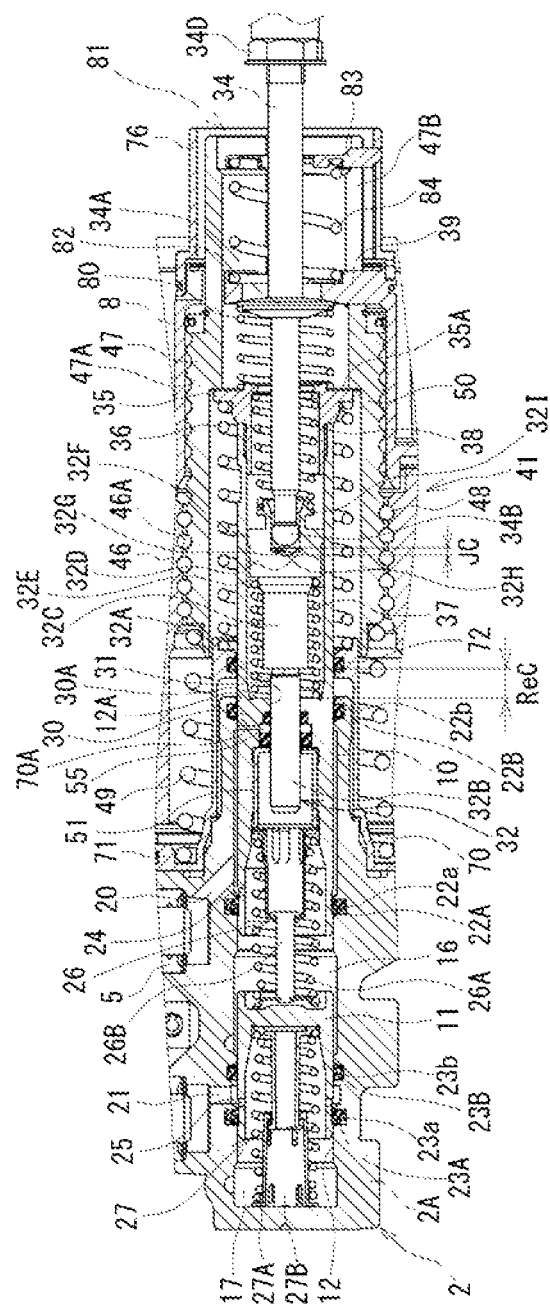
FIG. 2 is a longitudinal section of a relevant part of the electric booster shown in FIG. 1 when braking is not applied.

As illustrated in FIGS. 1 and 2, an electric booster 1 according to the present embodiment is a booster using an electric actuator as a drive source. The electric booster 1 has a structure in which a tandem master cylinder 2 is connected to one axial side (front side, or the left side on the drawing) of a housing 4 in which an electric actuator 3 is accommodated. Mounted on an upper portion of the master cylinder 2 is a reservoir 5 (partially shown) which feeds brake fluid to the master cylinder 2. In the housing 4, a rear cover 4B is interfitted with an opening side of a front housing 4A having a substantially bottomed cylinder-like shape to be fastened to the front housing 4A by a plurality of bolts 4C. The housing 4 accommodates the actuator 3.

A stud bolt 6 is fixed to the front housing 4A. The stud bolt 6 connects the master cylinder 2 to the front housing 4A by a nut 6A being fastened in an attachment portion 2B of master cylinder 2. A flat attachment seat face 7 is formed in the rear cover 4B of the housing 4. A cylinder portion 8 is disposed in the attachment seat face 7. The cylinder portion 8 is coaxial with the master cylinder 2 and protruding from a central portion of the attachment seat face 7 toward the other axial side of the housing 4 (back side, or the right side on the drawing), that is, in a direction away from the master cylinder 2. The electric booster 1 is placed in an engine room of the vehicle with the cylinder portion 8 extending into a vehicle interior through a dashboard (not shown) which is a partition wail between the engine room and the vehicle interior. In other words, the electric booster 1 is fined to the dashboard which is a part of a vehicle body by a plurality of stud bolts 7A fastened to the attachment seat face 7 with the attachment seat face 7 in contact with the dashboard. Disposed in an outer side of the front housing 4A is an ECU casing 4D housing an after-mentioned controller (hereinafter, referred to as ECU) 9. In the following description, the left side on the drawings, which is the one axial side of the housing 4, is referred to as "front" side, and the right side on the drawings, which is the other axial side of the housing 4, is referred to as "rear" side.

Figure 3:
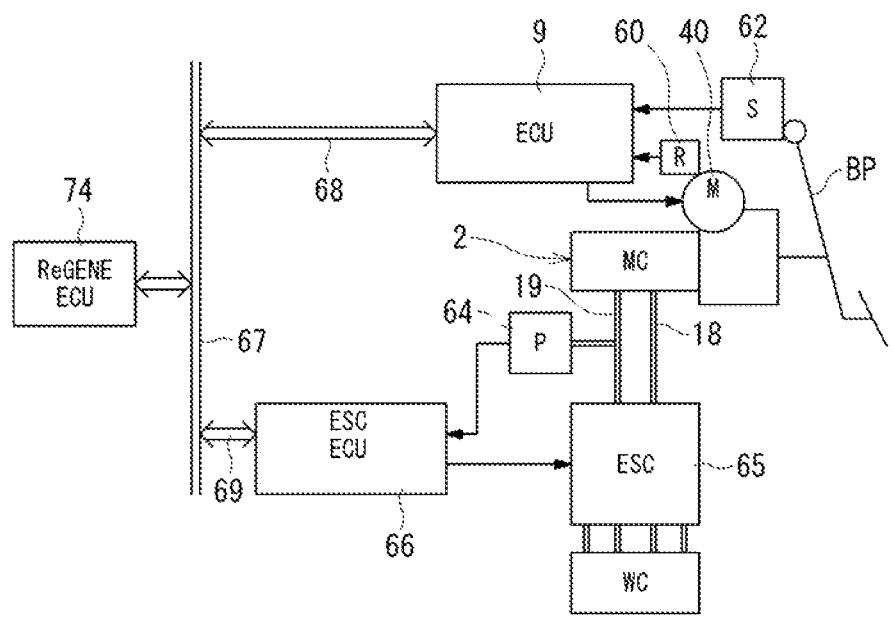
FIG. 3 shows a schematic configuration of a brake system, to which the electric booster of the first embodiment is applied.

A bottomed cylinder bore 12 is formed in a cylinder body 2A of the master cylinder 2. A substantially cylindrical primary piston 10 is placed on an opening 12A side of the cylinder bore 12 as a piston moved, by the actuator 3. A distal side of the primary piston 10 is formed into a cup-like shape and placed inside the master cylinder 2. A cut-shaped secondary piston 11 is placed on a bottom side of the cylinder bore 12. The primary piston 10 has a rear end portion formed to stretch from an opening of the master cylinder 2 into the housing 4 and continue to extend into the cylinder portion 8 of the rear cover 4B. Within the cylinder body 2A, a primary chamber 16 as a pressure chamber is defined by the cylinder bore 12, the primary piston 10, and the secondary piston 11, and a secondary chamber 17 as a pressure chamber is formed between a bottom of the cylinder bore 12 and the secondary piston 11. As illustrated in FIG. 3, the primary chamber 16 and the secondary chamber 17 are connected through hydraulic pressure ports (not shown) formed in the cylinder body 2A to dual hydraulic circuits 18 and 19 for providing hydraulic pressure to a wheel cylinder WC of each wheel.

In the cylinder body 2A, there are formed reservoir ports 20 and 21 for connecting the primary chamber 16 and the secondary chamber 17 to the reservoir 5. In an inner circumferential surface of the cylinder bore 12 of the cylinder body 2A, ring-like sealing grooves 22a, 22b, 23a and 23b are formed at predetermined axial intervals. Sealing members 22A, 22E, 23A and 23E are placed in the ring-like sealing grooves 22a, 22b, 23a and 23b, respectively. The sealing members 22A, 22B, 23A and 23B seal between the cylinder bore 12 and the primary piston 10, and between the cylinder bore 12 and the secondary piston 11. The two sealing members 22A and 22B are axially arranged across the reservoir port 20. When the primary piston 10 is in a non-braking position shown in FIGS. 1 and 2, the primary chamber 16 is in communication with the reservoir port 20 via a port 24 formed in a lateral wall of the primary piston 10. When the primary piston 10 moves forward from the non-braking position, and the port 24 reaches the sealing member 22A, the primary chamber 16 is separated from the communication with the reservoir port 20 by the sealing member 22A, which generates hydraulic pressure. An amount of displacement of the primary piston 10 from a time point when the primary piston 10 is in the non-braking position to a time point when the primary piston 10 is separated from the communication with the reservoir port 20 is called an invalid (dead) stroke. The two sealing members 23A and 23B are axially arranged across the reservoir port 21. When the secondary piston 11 is in a non-braking position shown in FIG. 1, the secondary chamber 17 is in communication with the reservoir port 21 via a port 25 formed in a lateral wall of the secondary piston 11. When the secondary piston 11 moves forward from the non-braking position, the secondary chamber 17 is separated from the communication with the reservoir port 21 by the sealing member 23A, which generates hydraulic pressure.

A spring assembly 26 is interposed between the primary piston 10 and the secondary piston 11 within the primary chamber 16. A spring assembly 27 is interposed between the bottom, of the master cylinder 2 and the secondary piston 11 within the secondary chamber 17. The spring assemblies 26 and 27 include helical compression springs 26A and 27A, respectively, which are held by extendable retainers 26B and 27B in predetermined compressed positions to be compressible against spring forces thereof. Within the primary piston 10, a cylindrical spacer 51 is interposed between the spring assembly 26 and an intermediate wall 30 of the primary piston 10.

The primary piston 10 is generally formed into a substantially cylindrical shape and includes the intermediate wall 30 inside at an axial center. A guide bore 31 is formed through the intermediate wall 30 in the axial direction. A small-diameter distal end portion 32B of a stepped input piston 32 with a stepped portion 32A is slidably and fluid-tightly inserted in the guide bore 31. A gap between the distal end portion 32B of the input piston 32 and the guide bore 31 is sealed by a seal 55. In the input piston 32, a medium-diameter portion 32C and a large-diameter portion 32D are formed further on a proximal side than the stepped portion 32A. Formed between the medium-diameter portion 32C and the large-diameter portion 32D is a spring receiving portion 32E with which an after-mentioned spring 37 is in contact. A guide portion 32F is formed in an outer periphery of the large-diameter portion 32D. The guide portion 32F comes into contact with an inner wall or the primary piston 10 to guide the input piston 32 in the axial direction. An aperture 32G is formed inside the large-diameter portion 32D to open in the proximal end of the input piston 32. The aperture 32G has a bottom 32H formed into a bowl-like recess. A spring receiving portion 32I is formed in an outer periphery of an opening of the aperture 32G, with which an after-mentioned spring 38 is in contact. As described above, the input piston 32 has the distal end facing the primary chamber 16 functioning as a pressure chamber located in the master cylinder 2, and is located to be axially displaceable relative to the primary piston 10.

An intermediate portion of the primary piston 10, which extends through the front housing 4A, is located inside a cylindrical spring receiving member 70 interfitted with an opening 85 of a bottom of the front housing 4A. The spring receiving member 70 guides the primary piston 10 slidably in the axial direction. The spring receiving member 70 has an outer flange 71 formed in one end portion thereof. The outer flange 71 is interfitted with the opening 85 of the bottom of the front housing 4A. The spring receiving member 70 is thus fixed to the front housing 4A and the master cylinder 2. The spring receiving member 70 supports and seals the primary piston 10 by using a sealing member 72 attached to a rear-end inner peripheral portion 70A. The opening 12A of the cylinder bore 12 of the master cylinder 2 is formed, to extend from the attachment portion 2B to the vicinity of the rear-end inner peripheral portion 70A. The sealing grooves 22b and the sealing member 22B are disposed in the opening 12A. The sealing member 22B is used to support the primary piston 10 and seal the inside and outside of the cylinder bore 12. According to the electric booster of the present embodiment, the rear-end inner peripheral portion 70A of the spring receiving member 70 and the opening 12A of the cylinder bore 12 increase axial length of a portion which supports the primary piston 10, suppressing inclination of the primary piston 10 with respect to the cylinder bore 12.

One side of an input rod 34 is located inside the cylinder portion 8 of the rear cover 48 and a rear portion of the primary piston 10. A distal end portion 34B on the one side of the input rod 34, which is located inside the rear portion of the primary piston 10, has a hemisphere distal end. The distal end portion 34B is located inside the aperture 32G of the input piston 32 so as to come into contact with the bottom 32H of the aperture 32G. The input rod 34 and the input piston 32 are movably and oscillatably (swingably or rockingly) coupled by the distal end portion 34B of the input rod 34 and the aperture 32G of the input piston. That is to say, a coupled section between the input rod 34 and the input piston 32 allows the input rod 34 to be inclined with respect to the primary piston 10 to a certain degree. The input piston 32 and the input rod 34 are axially movable relative to each other. The other end side of the input rod 34 extends outside from the cylinder portion 8. A brake pedal BP shown in FIG. 3 is coupled to the other end portion of the input rod 34, which extends outside, with a clevis 34C interposed therebetween. A flange-like stopper contact portion 34A is provided in a region located inside the cylinder portion 8 of the input rod 34. The input red 34 functioning as an input member is provided to be axially displaceable relative to the input piston 32. The input rod 34 is moreover located to be contactable with the input piston 32 in a position facing the input piston 32 in the axial direction. This way, the input rod 34 moves back and forth by operation of the brake pedal BP.

In a rear end portion of the cylinder portion 3 of the rear cover 4B, there is formed, a stopper 39 which extends in a direction of the input rod 34 located inside the cylinder portion 8, or in a radially inward direction. The stopper 39 is inserted in a guide groove 47B formed along the axial direction in a cylindrical rear end portion of a screw shaft 47 of an after-mentioned ball screw mechanism 41. A retreat position of the input rod 34 is determined by the stopper contact portion 34A of the input rod 34 coming into contact with the stopper 39.

A ring-like spring receiver 35 is attached to the rear end portion of the primary piston 10. The primary piston 10 is biased in a rearward direction by a return spring 36 functioning as a helical compression spring interposed between the rear end portion of the spring receiving member 70 and the spring receiver 35. The input piston 32 is resiliently held by a spring 37 (one spring of a first spring device) and a spring 38 (the other spring of the first spring device), which are helical compression springs interposed between the spring receiving portion 32E and the intermediate wail 30 of the primary piston 10 and between the spring receiving portion 32I and the spring receiver 35, respectively, in a neutral position as one example of a predetermined position of the input piston 32 as viewed in the axial direction shown in FIGS. 1 and 2, that is, a position where a spring force of the spring 37 and that of the spring 38 balance out. As to the springs 37 and 38 functioning as the first spring device, it is also possible to use only either one and decide the predetermined position by control of the actuator 3. When the brake pedal BP is not in operation, there is formed a clearance ReC that is predetermined distance between the stepped portion 32A of the input piston 32 and the other side face 30A of the intermediate wall 30 of the primary piston 10. The clearance ReC is a clearance (regeneration clearance) into which the primary piston 10 can move rearward relative to the input piston 32 during regenerative coordination control. At the failure of the electric motor 40 or the ECU 9, if the input piston 32 moves toward the master cylinder 2 by amount of the clearance ReC (predetermined distance) relative to the primary piston 10, the stepped portion 32A comes into contact with the other side face 30A of the intermediate wall 30 of the primary piston 10 and thus pushes the primary piston 10 toward the master cylinder 2. For this reason, at the time of failure of the electric motor 40 or the ECU 9, too, hydraulic pressure can be generated in the master cylinder 2 by the brake pedal BP being depressed, which enables friction braking.

A rearward spring 30 (second spring device) functioning as a helical compression spring is interposed between the spring receiver 35 attached to the rear end portion of the primary piston 10 and the stopper contact portion 34A of the input rod 34. The rearward spring 80 biases the input rod 34 by using a spring force thereof in such a direction that the input rod 34 draws away from the input piston 32. When braking is not applied (in a condition where the brake pedal is not in operation) as illustrated in FIGS. 1 and 2, a jump-in clearance JC, namely, a predetermined interspace, is formed between the bottom 32H of the input piston 32 and the distal end portion 34B of the input rod 34 by means of the rearward spring 80. The input piston 32 and the input rod 34 are relatively displaceable in the axial direction only by the amount of the jump-in clearance JC.

The actuator 3 accommodated in the housing 4 is formed of the electric motor 40, and the ball screw mechanism 41 which is a rotation-linear motion conversion mechanism that converts the rotation of the electric motor 40 into linear motion and provides thrust to the primary piston 10. According to the present embodiment, the electric motor 40 is a permanent magnet-embedded synchronous motor. The electric motor 40 includes a stator 42 provided with a plurality of coils, which is fixed to a stepped portion on a rear side of the bottom of the front housing 4A, a cylindrical rotor 45 located to face an inner peripheral surface of the stator 42, and a plurality of permanent magnets 45A inserted in the rotor 45 and arranged in a circumferential direction. The rotor 45 is fixed to an outer periphery of a nut member 46 which is a rotary member of the bail screw mechanism 41. The nut member 46 axially extends from the vicinity of the bottom of the front housing 4A to the vicinity of the rear cover 48. The nut member 46 is rot at ably supported by the front housing 4A and the rear cover 4B through the bearings 43 and 44 at both ends thereof. The electric motor 40 may be a synchronous motor in which a permanent magnet is provided in a surface or inside of the rotor 45, or another type of motor such as an induction motor.

The bail screw mechanism 41 includes the nut member 46 and the screw shaft 47. The screw shaft 47 is formed into a hollow tubular shape and located inside the nut member 46 and inside the cylinder portion 8 of the housing 4. The screw shaft 47 is a linear motion member which is movable in the axial direction and supported so as not to rotate around the axis. Helical grooves 46A and 47A are formed in an inner peripheral surface of the nut member 46 and an outer peripheral surface of the screw shaft 47, respectively, which are opposed faces of the nut member 46 and the screw shaft 47. A plurality of halls 48 are charged between the helical grooves 46A and 47A together with grease. The screw shaft 47 is supported to be movable in the axial direction, and so as not to rotate around the axis, by engagement of the stopper 39 formed in the cylinder portion 8 of a rear housing 4B, with the guide groove 47B axially formed in the rear end portion protruding from the cylinder portion 8 in the rearward direction. Because of the foregoing configuration of the bail screw mechanism 41, when the bails 48 roll along the helical grooves 46A and 47A along with rotation of the nut member 46, the screw shaft 47 moves in the axial direction. According to the bail screw mechanism 41, mutual conversion can be performed between rotary and linear motions of the nut member 46 and the screw shaft 47. According to the ball screw mechanism 41, as described above, the rotation of the nut member 46 can be converted into the linear motion of the screw shaft 47, and the linear motion of the screw shaft 47 can foe converted into the rotation of the nut member 46. A cylindrical cover member 76 which covers an outer periphery of a rear portion of the screw shaft 47 is mounted on the rear end portion of the cylinder portion 8 of the rear housing 4B.

According to the foregoing embodiment, the rotary motion of the rotor 45 of the electric motor 40 is directly transmitted to the nut member 46 of the bail screw mechanism 41. It is also possible to interpose a well-known deceleration mechanism, such as a planetary gear drive and a differential deceleration mechanism, between the electric motor 40 and the ball screw mechanism 41, decelerate the rotation of the electric motor 40, that is, increase torque of the electric motor 40, and then transmit the rotation of the electric motor 40 to the ball screw mechanism 41. It is also possible to place the electric motor outside the housing 4 and drive the nut member 46 by using a transmission mechanism, such as a belt, gear, and chain.

The screw shaft 47 of the bail screw mechanism 41 is biased rearward by a spring force of a return spring 49 which is a compression tapered coil spring interposed between the screw shaft 47 and the outer flange 71 of the spring receiving member 70. A retreat position of the screw shaft 47 is determined by the rear end portion of the screw shaft 47 coming into contact with the stopper 39 disposed in the cylinder portion 8 of the rear cover 48. The rear end portion of the primary piston 10 is inserted in the screw shaft 47, and the spring receiver 35 comes into contact with a ring-like stepped portion 50 formed in an inner periphery of the screw shaft 47 with a shim 35A intervening therebetween. In this manner, the retreat position of the primary piston 10 relative to the screw shaft 47 is determined. When the screw shaft 47 moves forward, the primary piston 10 is pushed by the stepped portion 50 to move forward with the screw shaft 47. The primary piston 10 can also be separated away from the stepped portion 50 and independently move forward. As illustrated in FIGS. 1 and 2, a non-braking position of the primary piston 10 is determined by the stepped portion 50 of the screw shaft 47 in contact with the stopper 39. A retreat position, or a non-braking position, of the secondary piston 11 is determined by maximum lengths of the primary piston 10 and the spring assembly 26 in the non-braking position.

A reaction force mechanism 81 is disposed in the rear end portion of the cylinder portion 8 of the rear cover 4B. The reaction force mechanism 81 includes a fixed spring receiver 82, a movable spring receiver 83, and a reaction spring 84. The fixed spring receiver 82 is integrally formed in a rear portion of the stopper 39. The movable spring receiver 83 is placed in the screw shaft 47 to face the fixed spring receiver 82. The movable spring receiver 83 is movable in the axial direction. The reaction spring 84 is a helical compression spring interposed between the fixed spring receiver 82 and the movable spring receiver 83. A retreat position of the movable spring receiver 83, which is shown in FIGS. 1 and 2, is determined by the movable spring receiver 83 coming into contact with a rear portion of the cover member 76. When the input rod 34 moves forward only a predetermined distance relative to the cover member 76, or the cylinder portion 8 (housing 4), a lock nut 34D of the clevis 34C comes into contact with the movable spring receiver 83. Further forward movement of the input rod 34 compresses the reaction spring 84, and the spring force thereof is provided as a reaction force to the forward movement of the input rod 34.

The housing 4 accommodates a resolver 60 which is a rotational position sensor for detecting a rotational position of the rotor 45 of the electric motor 40. The resolver 60 includes a resolver rotor 60A fixed to on outer peripheral portion on a rear portion side of the nut member 46 and a resolver stator 60B mounted on the rear cover 4B in an opposed position to the resolver rotor 60A. The resolver 60 detects the rotational position of the rotor 45 on the basis of relative displacement between the resolver rotor 60A and the resolver stator 60B.

The ECU 9 of the electric booster 1 is a microprocessor-based electronic control unit. As illustrated in FIG. 3, the electric motor 40 and the resolver 60 are connected to the ECU 9. The ECU 9 is also connected with a stroke sensor 62 for detecting displacement of the brake pedal, namely, displacement of the input rod 34. A hydraulic pressure sensor 64 is disposed in the dual hydraulic circuits 18 and 19 for providing hydraulic pressure to the wheel cylinder WC of each wheel. The hydraulic pressure sensor 64 detects hydraulic pressure of either the primary chamber 16 or the secondary chamber 17. In FIG. 3, the hydraulic pressure sensor 64 is disposed in the hydraulic circuit 19 to detect the hydraulic pressure of the secondary chamber 17.

The hydraulic pressure sensor 64 is placed in the middle of the dual hydraulic circuits 18 and 19 and connected to a controller 66 (hereinafter, referred to as ECU 66) of a hydraulic pressure supplier 65 (hereinafter, referred to as ESC 65) which controls the supply of brake fluid to the wheel cylinder WC of each wheel. The ECU 9 and the ECU 66 are connected to a data bus 67 which performs information transmission in the vehicle, through signal lines 68 and 69, respectively. Hydraulic pressure of the master cylinder 2, which is detected by the hydraulic pressure sensor 64, is transmitted in the form of a signal from the ECU 66 of the ESC 65 through the signal line 69, the data bus 67, and the signal line 68 to the ECU 9 of the electric booster 1.

The data bus 67 is connected with a regenerative braking controller 74 (hereinafter, referred to as ECU 74) which controls the regenerative braking in which a generator is driven by wheel rotation, and kinetic energy is then converted into electrical energy to be recovered at the braking of the vehicle. The electric booster 1 is operated by the ECU 9 controlling the rotation of the electric motor 40 in accordance with detection signals transmitted from the various sensors. The ECU 9 of the electric booster 1 receives regenerative braking information from the ECU 74 and thus performs regenerative coordination control which subtracts the hydraulic brake pressure corresponding to the regenerative braking amount from, the hydraulic brake pressure generated in the master cylinder by brake pedal operation.

Operation of the electric booster 1 will now foe described below.

The input rod 34 is made to move forward by operating the brake pedal BP, and an operation amount of the brake pedal BP, or the displacement of the input rod 34, is detected by the stroke sensor 62. The actuation of the electric motor 40 is controlled by the ECU 9 according to the displacement of the input rod 34. The primary piston 10 is pushed by the stepped portion 50 of the screw shaft 47 of the ball screw mechanism 41 through the spring receiver 35. The primary piston 10 is thus caused to move forward to follow the displacement of the input rod 34. This generates hydraulic pressure in the primary chamber 16. This hydraulic pressure is transferred through the secondary piston 11 to the secondary chamber 17. The hydraulic brake pressure thus generated in the master cylinder 2 is supplied through the hydraulic circuits 18 and 19 to the wheel cylinder WC of each wheel and creates a braking force by friction braking. When the operation of the brake pedal BP is released, the ECU 9 controls the actuation of the electric motor 40 according to the displacement of the input rod 34 to make the screw shaft 47 move rearward. This causes rearward movement of the input piston 32, the primary piston 10, and the secondary piston 11, and decreases the hydraulic brake pressure of the master cylinder 2, thereby releasing the braking force. As the primary piston 10 and the secondary piston 11 operate in the same manner, the following description will refer only to the primary piston 10.

At the generation of the hydraulic pressure, the hydraulic pressure of the primary chamber 16 is received by the input piston 32, and the reaction force thereof is transmitted, or fed back, to the brake pedal BP through the input rod 34. This makes it possible to create a desired braking force with a predetermined boosting ratio (ratio of hydraulic pressure output to a brake-pedal operation force). The ECU 9 is capable of adjusting a relative positions of the input piston 32 and the primary piston 10 following the input piston 32 by controlling the electric motor 40. To be specific, the hydraulic pressure output with respect to the brake pedal operation can be increased if a displacement amount of the primary piston 10 is adjusted forward further than a displacement amount of the input piston 32, and the hydraulic pressure output with respect to the brake pedal operation can be reduced if the displacement amount of the primary piston 10 is adjusted rearward further than the displacement amount of the input piston 32. This enables brake controls including boosting control, brake assist control, inter-vehicle distance control, and regenerative coordination control. In particular, if the primary piston 10 is adjusted rearward, relative to the input piston 32 to reduce the hydraulic output with respect to the brake pedal operation and decrease the hydraulic pressure of the primary chamber 16, the regenerative braking at the time of regenerative coordination can be performed while the braking force caused by the hydraulic pressure is suppressed. At the adjustment of the relative position of the primary piston 10 to the input piston 32, the spring force of the spring 37 or 38 acts on the input piston 32 and thus moderates the reaction force acting on the input rod 34, so thereby suppress fluctuations of a brake pedal force.

When the output of the electric motor 40 controlled by the ECU 9 reaches a maximum output value, and the hydraulic pressure of the primary chamber 16 and the thrust of the primary piston 10 balance out, the primary piston 10 cannot move further forward and stops. If the brake pedal is further depressed in the full-load condition as described above, while the input rod 34 makes forward movement, the primary piston 10 remains at rest, and only the input piston 32 moves forward while compressing the spring 37. The stop of the movement of the primary piston 10 raises the hydraulic pressure of the primary chamber 16 with respect to an amount of forward movement of the input piston 32, and thus lowers an increase rate of the pedal reaction force which is fed back to the brake pedal through the input piston 32 and the input rod 34, as compared to before the full load condition. This reduces the pedal reaction force in the middle of brake pedal operation and might bring a feeling of strangeness to the driver.

When a displacement distance of the input piston 32 relative to the housing 4 by the brake pedal operation reaches a predetermined distance, or a position in which the input piston 32 comes into the full load condition, the lock nut 34D of the clevis 34C comes into contact with the movable spring receiver 83 of the reaction force mechanism 81 to compress the reaction spring 84. The spring force thereof is provided as a reaction force to the brake pedal and compensates a decreased amount of the pedal reaction force. This suppresses the feeling of strangeness which is brought to the driver. After the full load condition takes place, if the brake pedal is further depressed, the stepped portion 32A of the input piston 32 comes into contact with the intermediate wall 30 of the primary piston 10, and the primary piston 10 moves forward with the input piston 32. The hydraulic pressure of the primary chamber 16 is then raised. The reaction force is also increased by amount of the pressure rise.

Figure 6:
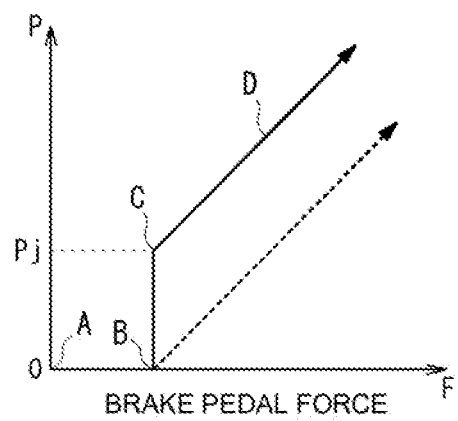
FIG. 6 is a graph showing input/output characteristics of the electric booster shown in FIG. 1.
Figure 7:
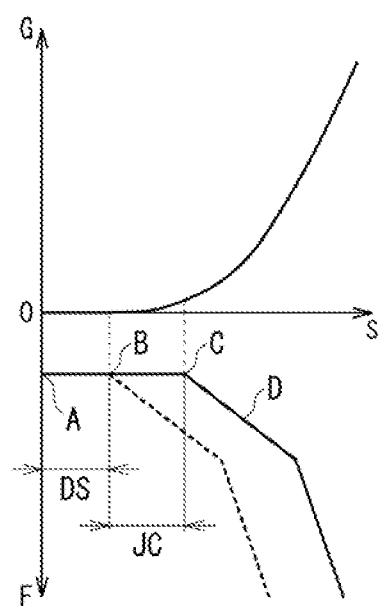
FIG. 7 is a graph showing input-stroke-deceleration characteristics of the electric booster shown in FIG. 1.

The jump-in characteristics at an initial stage of braking will be described with reference to FIGS. 2, 4, 5 and 6. FIG. 6 shows relationship between input and output hydraulic pressures of the electric booster 1 having the jump-in characteristics, namely, relationship between a brake pedal force F acting on the brake pedal BP and hydraulic pressure P generated in the master cylinder 2. FIG. 7 shows relationship of input, input stroke, and vehicle deceleration, that is, relationship of the brake pedal force F acting on the brake pedal BP (input), stroke S of the input rod 34, and vehicle deceleration G. In FIGS. 6 and 7, broken lines show characteristics of a conventional electric booster which is not provided with the jump-in clearance JC.

In the non-braking condition shown in FIG. 2 (condition A in FIGS. 6 and 7), the input rod 34 moves rearward from the input piston 32 due to the spring force of the rearward spring 80. The jump-in clearance JC is secured between the distal end portion 34B of the input rod 34 and the bottom 32H of the input piston 32.

When the brake pedal BP starts being depressed, and the input rod 34 begins to move forward, the ECU 9 actuates the electric motor 40 with respect to the stroke of the input rod 34, which is detected by the stroke sensor 62. In reaction to the actuation of the electric motor 40, the ball screw mechanism 41 causes the primary piston 10 to move forward only by the same stroke as the stroke (displacement amount) of the input rod 34. Once the forward movement of the primary piston 10 solves the invalid stroke DS, the hydraulic brake pressure starts generating in the primary chamber 16 (condition B in FIGS. 6 and 7). The input piston 32 is held by the primary piston 10 through the springs 37 and 38 until the invalid stroke DS is solved (a time period between the condition A in FIGS. 6 and 7 and the condition B), so that the input piston 32 moves forward with the primary piston 10, maintaining the jump-in clearance JC formed between the distal end portion 34 of the input rod 34 and the bottom 32H of the input piston 32.

Figure 4:
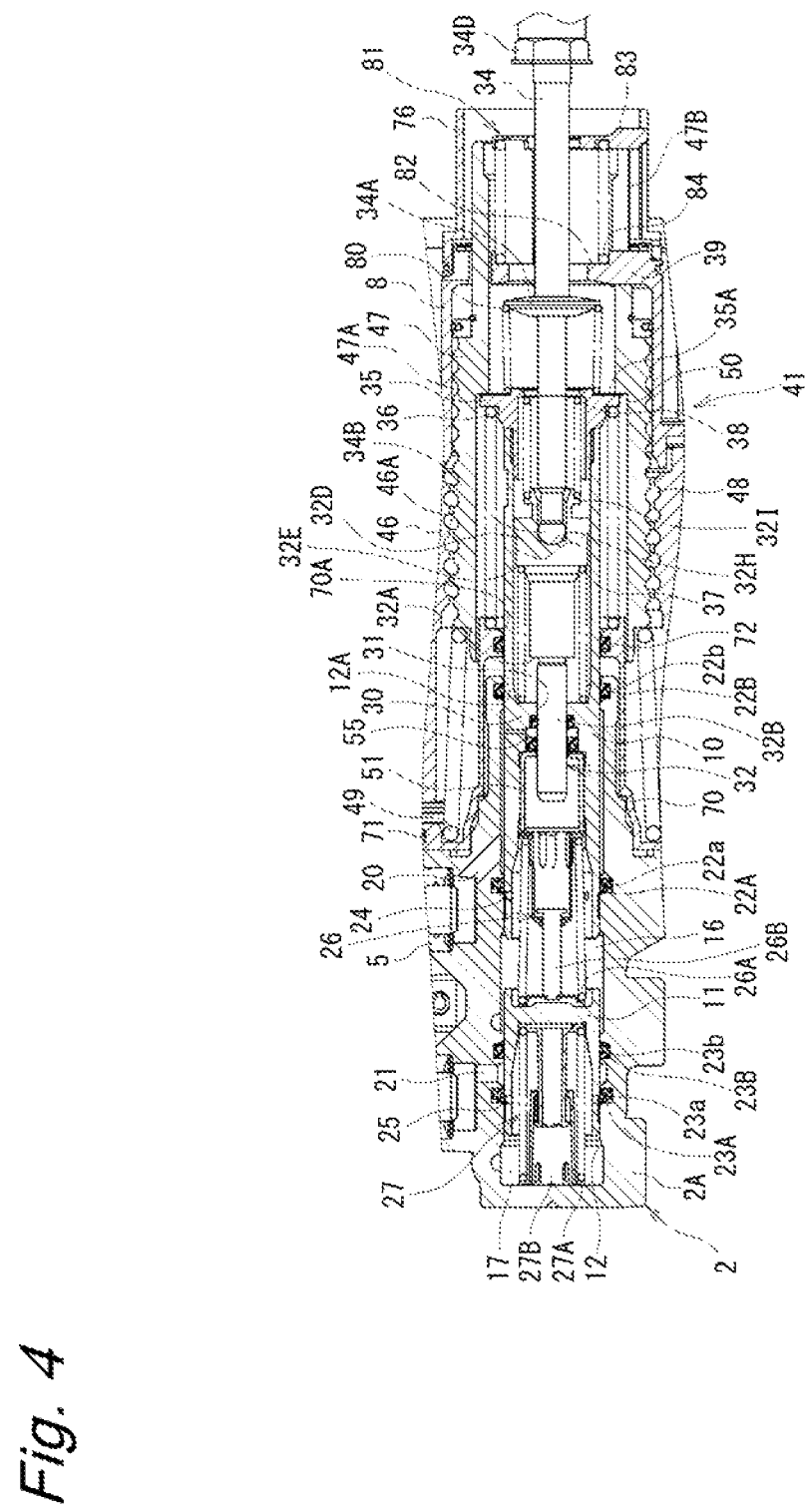

When the brake pedal BP is further depressed, and the input rod 34 further moves forward, the hydraulic pressure generated in the primary chamber 16 by the forward movement of the primary piston 10 acts on the input piston 32, leading to imbalance between the spring forces of the springs 37 and 38, which triggers the rearward movement of the input piston 32. The rearward movement of the input piston 32 makes the distal end portion 34B of the input rod 34 and the bottom 32H of the input piston 32 move closer to each other, and reduces the jump-in clearance JC by degrees. While the jump-in clearance JC exists, that is, before the bottom 32H of the input piston 32 and the distal end portion 34B of the input rod 34 come into contact with each other, the reaction force caused by the hydraulic pressure of the primary chamber 16 is not transmitted to the input rod 34, namely, the brake pedal BP. As illustrated in FIG. 4, after the bottom 32H of the input piston 32 and the distal end portion 34B of the input rod 34 come into contact with each other (jump-in clearance JC=0 (zero); condition C in FIGS. 6 and 7), the input piston 32 and the input rod 34 move in conjunction with each other (condition D in FIGS. 6 and 7). The reaction force caused by the hydraulic pressure of the primary chamber 16 is then transmitted through the input piston 32 to the input rod 34 and fed back to the brake pedal BP.

Figure 5:
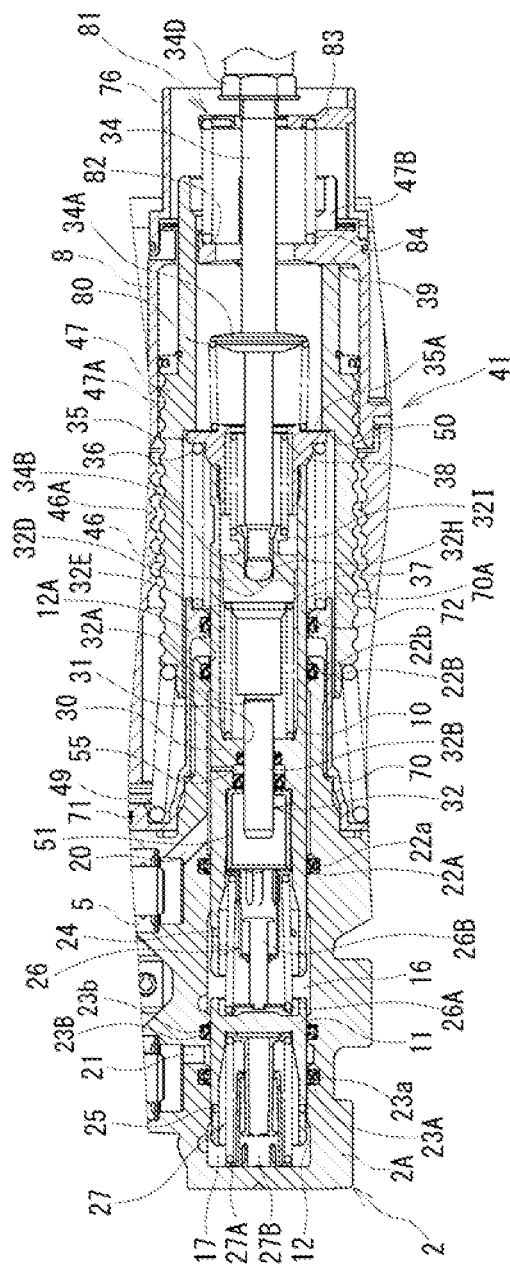
FIG. 5 is a longitudinal section of the relevant part of the electric booster shown in FIG. 1 during regular boosting.

Jump-in hydraulic pressure Pj generated in the primary chamber 16 when the input piston 32 and the input rod 34 come into contact with each other (jump-in clearance=0 (zero); condition in FIG. 5) is obtained by the following formula.

$$Pj=(k1+k2)JC/S \qquad (1),$$

where k1 designates a spring constant of the spring 37;

k2 designates a spring constant of the spring 38;

S designates a pressure-receiving area of the input piston 32 with respect to the primary chamber 16; and JC designates the jump-in clearance.

In the foregoing manner, at the start of depression of the brake pedal, the hydraulic brake pressure (braking force) can be quickly created by the jump-in characteristics, which provides a good brake feeling. Since the input piston 32 and the primary piston 10 can be relatively displaced in forward and rearward directions along the axial direction in a separate position from the jump-in clearance JC, it is possible to provide a sufficiently large adjustment amount when the position of the primary piston 10 relative to the input piston 32 is adjusted forward and rearward, and also provide a sufficiently large control range of the brake controls including boosting control, brake assist control, inter-vehicle distance control, and regenerative coordination control. In particular, the relative displacement amount during the regenerative coordination control which adjusts the primary piston 10 rearward relative to the input piston 32 can be made larger than the jump-in clearance JC, which increases energy which can be recovered by regeneration. Moreover, spring characteristics of the rearward spring 80 make it possible to adjust the reaction force of the brake pedal during the jump-in.

A second embodiment will be described below with reference to FIGS. 8 to 13.

The following description will explain only different matters from the first embodiment in details, and components identical to those of the first embodiment will be provided with the same reference marks.

Figure 8:
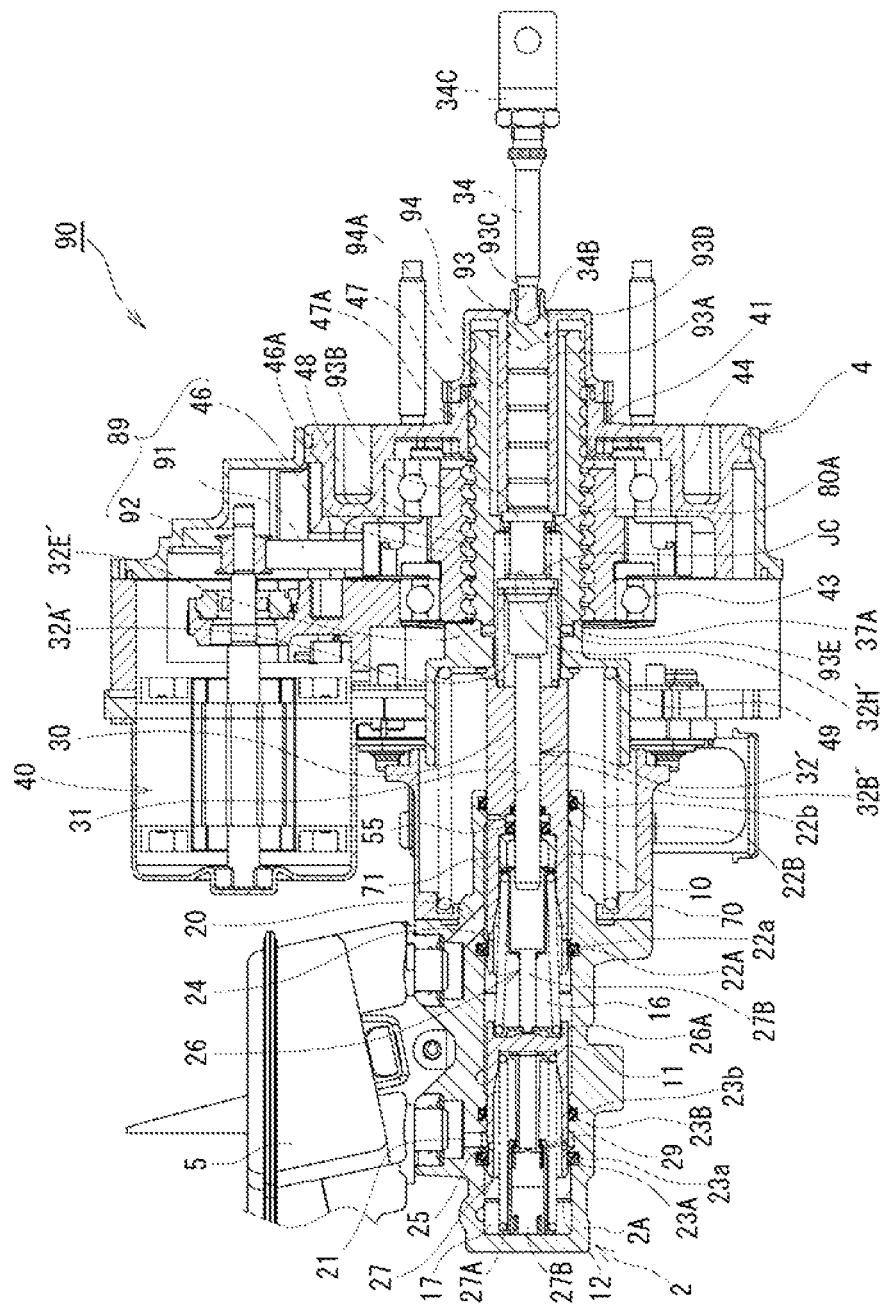
FIG. 8 is a longitudinal section of an electric booster according to a second embodiment.
Figure 9:
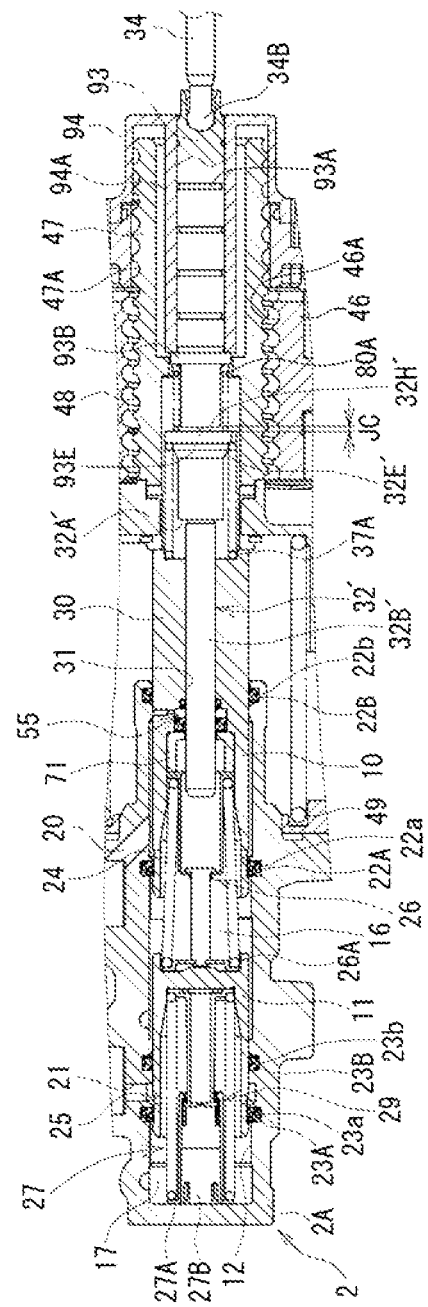
FIG. 9 is a longitudinal section of a relevant part of the electric booster shown in FIG. 8 when braking is not applied.

As illustrated in FIGS. 8 and 9, according to an electric booster 90 of the present embodiment, the electric motor 40 is located outside the housing 4 and drives the nut member 46 through a belt 91 and a pulley 92 forming a belt transmission mechanism 89. The input rod 34 includes a plunger rod 93 placed between the input rod 34 and the input piston 32. The input rod 34 has the distal end portion 34B which is coupled to the plunger rod 93 in a position inserted in an aperture 93C formed on a proximal side of the plunger rod 93 and in contact with a bottom 93D of the aperture 93C. The plunger rod 93 is guided to be movable in the axial direction by a guide cover 94 attached to the rear end portion of the rear cover 48 of the housing 4. According to the present embodiment, an input member is formed of the input rod 34 and the plunger rod 93.

The input piston 32 has a distal end portion 32B' which extends through the primary piston 10 and is located to face the primary chamber 16. The input piston 31 also has a proximal end face 32H' in a proximal end portion thereof. A distal end face 93E of the plunger rod 93 is located to face the proximal end face 32H'. A jump-in clearance JC is secured between the proximal end face 32H' of the input piston 32' and the distal end face 93E of the plunger rod 93.

The guide cover 94 has a double cylinder structure and includes a small-diameter cylindrical guide portion 94A which is integrally formed along the axial direction in a central portion of a bottom of the guide cover 94. The guide portion 94A has a distal end portion extending into the housing 4. The plunger rod 93 is guided slidably in the axial direction and supported so as not to move and incline in a radial direction by means of the guide portion 94A of the guide cover 94. A plurality of peripheral grooves 93A are formed in the plunger rod 93 and enhance seal efficiency and slidability between the plunger rod 93 and the guide portion 94A. A retread position of the plunger rod 93 is determined by a large-diameter flange 93B formed in an intermediate portion coming into contact with the distal end portion of the guide portion 34A.

The input piston 32' is resiliently held in a predetermined position as viewed in the axial direction by a spring 37A which is a helical compression spring functioning as the first spring device interposed between a spring receiving portion 32E' and the intermediate wall 30 of the primary piston 10 and a spring 80A which is a helical compression spring functioning as the second spring device between a proximal end face 32H' and the flange 93B of the plunger rod 93. As an example, the present embodiment resiliently holds the input piston 32' in a neutral position shown in FIGS. 8 and 9. The spring 37A adjusts a reaction force acting on the input rod 34 (brake pedal) at the relative displacement between the input piston 32' and the primary piston 10. The spring 80A biases the plunger rod 93 in such a direction that the plunger rod 93 draws away from the input piston 32' and thus secures the jump-in clearance JC. The reaction force mechanism 81 is omitted in the present embodiment.

Operation of the electric booster 90 will now be described below.

As with the first embodiment, the actuation of the electric motor 40 is controlled by the ECU 9 in accordance with the displacement of the input rod 34 by the operation of the brake pedal BP. The primary piston 10 is moved by the belt transmission mechanism 89 and the ball screw mechanism 41 to follow the displacement of the input rod 34. This generates hydraulic pressure in the primary chamber 16. If the operation of the brake pedal BP is released, the input piston 32' and the primary piston 10 move rearward to release the hydraulic brake pressure of the primary chamber 16. The hydraulic pressure of the primary chamber 18 is received by the input piston 32', and the reaction force thereof is fed back to the brake pedal through the plunger rod 93 and the input rod 34. This makes it possible so create a desired braking force with a predetermined boosting ratio. While the reaction force of the hydraulic pressure of the primary chamber 16 is fed back to the input rod 34, the ECU 9 can adjust the relative positions of the input piston 32' and the primary piston 10 which follows the input piston 32'. In this case, there is a change in hydraulic pressure of the master cylinder 2 opposed to the position of the input rod 34, which causes fluctuations in the reaction force of the hydraulic pressure, which is transmitted to the input rod 34. However, because of the spring force of the spring 37A, which acts on the input piston 32', the reaction force acting on the input rod 34 can be adjusted. It is then possible to suppress the fluctuations in the reaction force transmitted to the brake pedal BP (fluctuations in the brake pedal force) along with the adjustment of the relative positions. At this time, the boosting ratio can be increased by adjusting the position of the primary piston 10 forward in relation to the input piston 32', and can be reduced by rearward adjustment. Brake controls including boosting control, brake assist control, inter-vehicle distance control, and regenerative coordination control can be performed by using the ECU 9 to control the rotation of the electric motor 40 on the basis of a vehicle condition according to detection signals of the various sensors.

Figure 12:
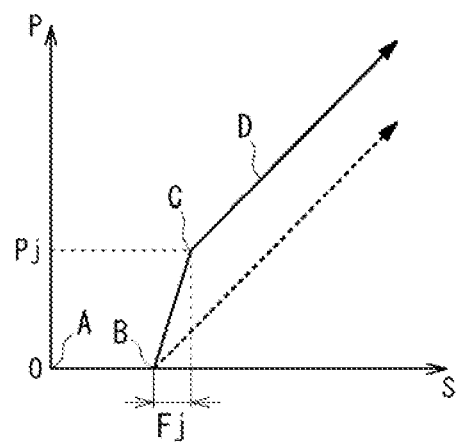
FIG. 12 is a graph showing input/output characteristics of the electric booster shown in FIG. 8.
Figure 13:
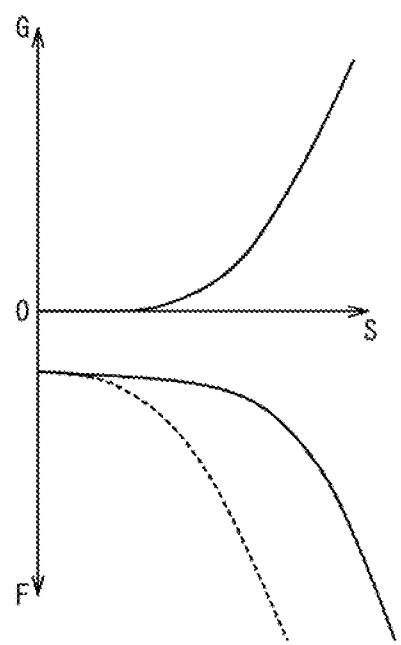
FIG. 13 is a graph showing input-stroke-deceleration characteristics of the electric booster shown in FIG. 8.

The jump-in characteristics at the initial stage of braking will be described with reference to FIGS. 9 to 13. As in FIG. 6, FIG. 12 shows the relationship between the input and output hydraulic pressures in the electric booster 90 having the jump-in characteristics. FIG. 13, like FIG. 7, shows the relationship of the input, the stroke, and the vehicle deceleration. The broken lines in FIGS. 12 and 13 show the characteristics of the electric booster which is not provided with the jump-in clearance JC.

In a condition where the brake pedal is not in operation as illustrated in FIG. 9 (condition A in FIG. 12), the plunger rod 93 is retreated from the input piston 32' due to the spring force of the spring 80A. The jump-in clearance JC is secured between the distal end face 93E of the plunger rod 93 and the proximal end face 32H' of the input piston 32'.

When the brake pedal BP starts being depressed, and the input rod 34 and the plunger rod 93 begin to move forward, the ECU 9 actuates the electric motor 40 with respect to the stroke of the input rod 34, which is detected by the stroke sensor 62. In reaction to the actuation of the electric motor 40, the belt transmission mechanism 89 and the ball screw mechanism 41 cause the primary piston 10 to move forward to follow the displacement of the input rod 34. Once the forward movement of the primary piston 10 solves the invalid stroke DS, the hydraulic brake pressure starts generating in the primary chamber 16 (condition B in FIG. 12). Since the input piston 32' is held by the primary piston 10 through the springs 37A and 80A, the input piston 32' moves forward with the primary piston 10, which maintains the jump-in clearance JC.

Figure 10:
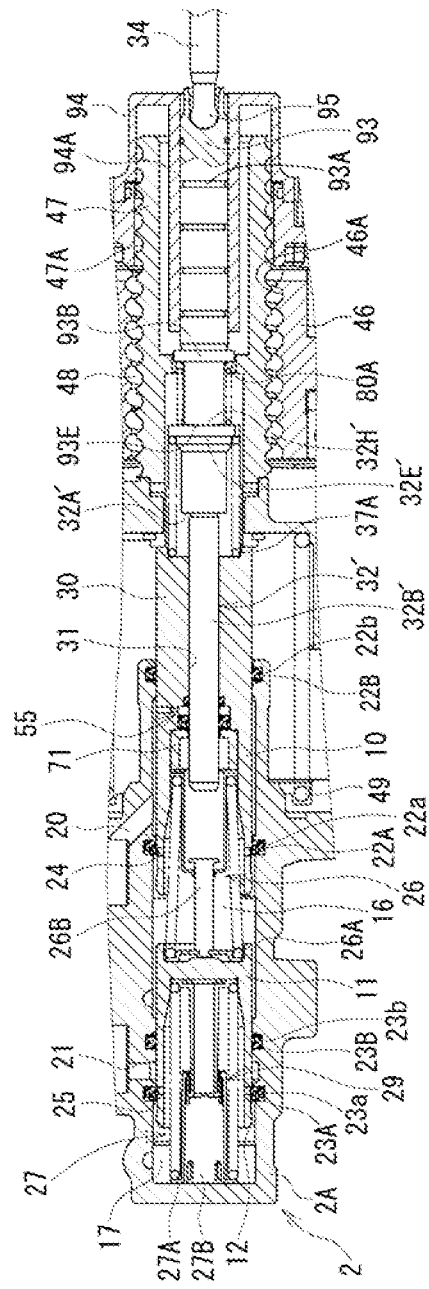
Figure 11:
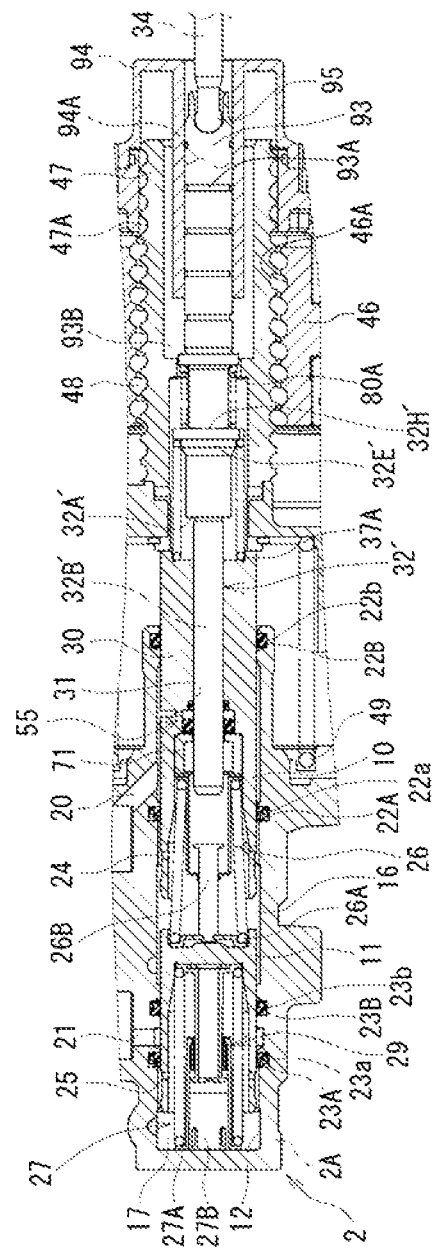
FIG. 11 is a longitudinal section of the relevant part of the electric booster shown in FIG. 8 during regular boosting.

When the brake pedal BP is further depressed, and the input rod 34 and the plunger rod further move forward, the hydraulic pressure of the primary chamber 16 is applied to the input piston 32'. The input piston 32' moves rearward, and the jump-in clearance JC is reduced by degrees. In contrast to the first embodiment, when the jump-in clearance JC is reduced, the spring 80A is compressed by amount corresponding to the reduction of the jump-in clearance JC. The spring force thereof is provided as a reaction force from the flange 93B through the plunger rod 93 to the input rod 34 and the brake pedal BP. In the first embodiment, as shown in an input-output characteristic graph of FIG. 6, output P relative to input F rises straight up at the transition from the condition B to the condition C. According to the present embodiment, however, as shown in an input-output characteristic graph of FIG. 12, a brake pedal force Fj with respect to a reaction force corresponding to the compression of the spring 80A is required at the transition from the condition B to the condition C, so that the output P relative to the input F rises obliquely. As illustrated in FIG. 10, after the proximal end face 32H' of the input piston 32' and the distal end face 93E of the plunger rod 93 (input rod 34) come into contact with each other (jump-in clearance JC=0 (zero); condition C in FIG. 12), the input piston 32, the plunger rod 93, and input rod 34 move integrally (condition D in FIG. 12). The reaction force caused by the hydraulic pressure of the primary chamber 16 is transmitted to the plunger rod 93 and the input rod 34 and then fed back to the brake pedal BP.

When the input piston 32' and the plunger rod 93 come into contact with each other (jump-in clearance J=0 (zero); condition C in FIG. 12), the jump-in hydraulic pressure Pj generated in the primary chamber 16 is obtained by the formula (1); as in the first embodiment.

The input (brake pedal force) Fj at the generation of the jump-in hydraulic pressure Pj is obtained by the following formula.

$$Fj = k2 \times JC \qquad (2)$$

According to the formulae (1) and (2), gradient characteristics Pj/Fj of the input-output hydraulic pressures of the jump-in characteristics can be arbitrarily set on the basis of spring constants k1 and k2 of the springs 37A and 80A, the pressure-receiving area S of the input piston 32, and the jump-in clearance JC.

The jump-in characteristics enable the quick creation of the hydraulic brake pressure (braking force) and the achievement of a good brake feeling at the starting of depression of the brake pedal BP as described above. The present embodiment can provide similar operation and advantages as with the first embodiment. The present embodiment, can also adjust the brake pedal reaction force during the jump-in because of the spring characteristics of the spring 80A.

As to electric vehicles (EVs) and hybrid vehicles (HEVs), there has been a desire to improve regeneration efficiency to increase cruising ranges. In the regenerative coordination control performed by the ECU 9, therefore, it has been an issue to apply regenerative braking, instead of applying the friction braking by master-cylinder hydraulic pressure, that is, to increase regeneration amount, when the vehicle is in a condition where the regenerative braking can be applied. To increase the regeneration amount, it is necessary to perform regenerative coordination control without hydraulic pressure, which does not generate hydraulic pressure in the master cylinder and preferably applies regenerative braking at the initial stage of braking.

If the regenerative coordination control without hydraulic pressure is performed in the conventional electric boosters disclosed in the Patent Document 1 and the Japanese Unexamined Patent Application Publication No. 2007-191133, the control needs to be conducted so as not to move the primary piston forward while the input member moves forward according to the operation of the brake pedal. This causes an input member to compress one spring placed on a forward side of the input member, which is one of a pair of springs which function to hold the input member in a neutral position relative to the primary piston. The one spring serves as a reaction force mechanism for suppressing fluctuations in a brake pedal force corresponding to reduction of hydraulic pressure during regenerative control. The one spring therefore has a such spring constant that a reaction force during compression is relatively large. For that reason, a relatively large brake pedal force is required to compress the one spring. This large brake pedal force is required immediately after the brake pedal starts being depressed, which might bring a feeling of strangeness to the driver.

In contrast, the electric boosters 1 and 90 of the embodiments described above include the jump-in clearance JC between the input piston 32 and the input rod 34, and between the input piston 32' and the input rod 93, respectively. When performing the regenerative coordination control without hydraulic pressure, the electric boosters 1 and 90 compress the spring 37, 37A corresponding to the one spring after the input rod 34, 93 is propelled by the amount of the jump-in clearance JC. The reaction force of the spring 37, 37A is transmitted to the brake pedal BP after the brake pedal BP is depressed by a certain degree. This suppresses the feeling of strangeness which is brought to the driver.

Figure 14:
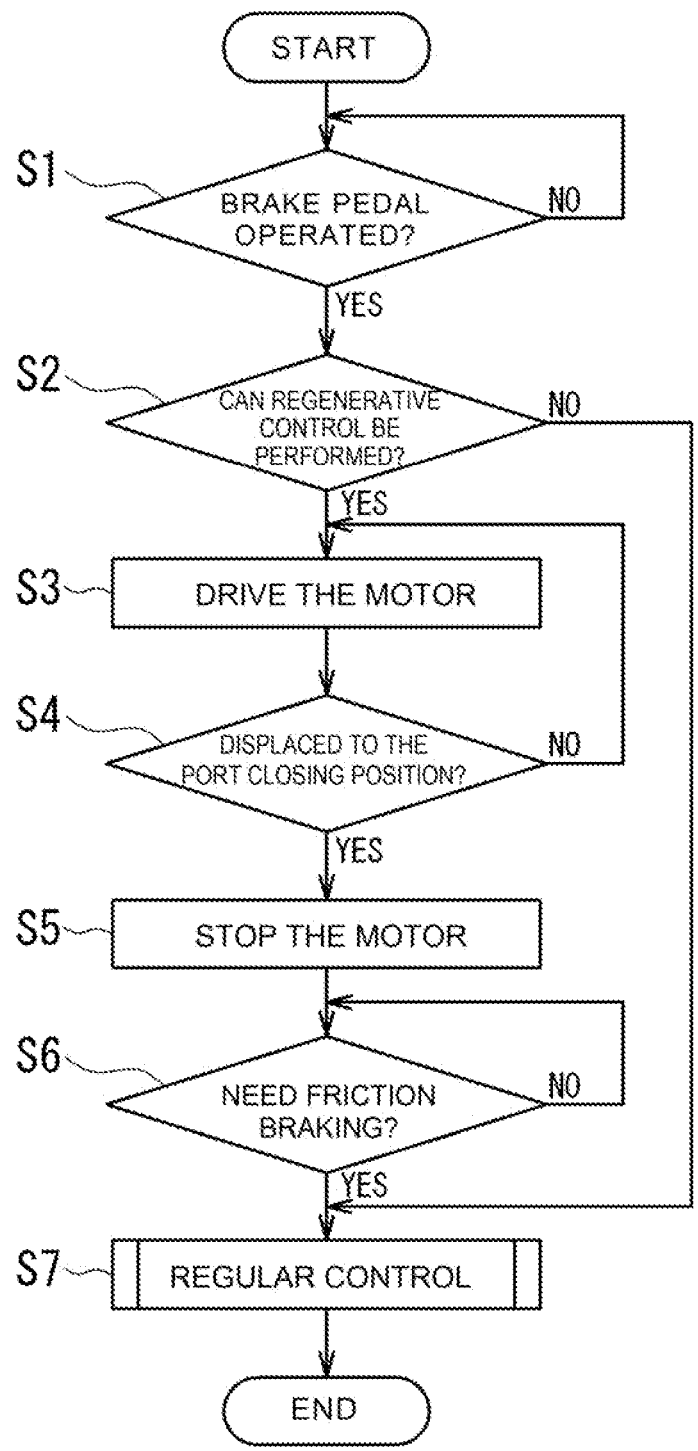
FIG. 14 is a flowchart showing motor control during regenerative coordination of the electric booster.

Contents of the control performed by the ECU 9 in the case where the regenerative coordination control without hydraulic pressure is performed will be described with reference to a flowchart of FIG. 14, taking the structure of the electric booster 1 of the first embodiment as an example.

In Step S1, it is detected by the stroke sensor 62 whether the brake pedal BP has been operated. Step S1 then calculates a target braking force corresponding to an operation amount. In Step S2, the calculated target braking force is shared with the regenerative braking controller 74, and it is detected whether regenerative braking is achievable.

If step S2 determines that the regenerative braking can be performed, Step S3 drives the electric motor 40 to rotate so that the primary piston 10 is propelled with the input rod 34.

The routine then advances to Step S4. Step S4, on the basis of a detection signal of the resolver 60, detects whether the primary piston 10 has been propelled to a position in which the port 24 of the primary piston 10 is closed by the sealing member 22A (port closing position), namely, a position in which the invalid, stroke DS is solved or a position before hydraulic pressure is generated in the master cylinder 2. If it is detected that the primary piston 10 has been propelled to the port closing position, Step S5 stops the rotation of the electric motor 40 and holds the primary piston 10 at the port closing position. By this time, the primary piston 10 has been propelled with the input rod 34, so that the jump-in clearance JC formed between the input piston 32 and the input rod 34 is maintained. Regenerative braking is also performed by the regenerative braking controller 74.

After Step S5 stops the rotation of the electric motor 40, the ECU 9 makes a determination in Step S6 as to whether there is a need for friction braking, which actuates the wheel cylinders WC by the hydraulic pressure generated in the master cylinder 2, through communication with the regenerative braking controller 74. The ECU 9 holds the primary piston 10 at the port closing position until the friction braking is required. If the brake pedal BP continues to be depressed at this point of time, the input rod 34 moves forward while the input piston 32 held by the primary piston 10 is at rest, which makes the jump-in clearance JC smaller and smaller. Once the input rod 34 comes into contact with the input piston 32, the input piston 32 moves integrally with the input rod 34, compressing the spring 37. The reaction force of the spring 37 is then transmitted to the brake pedal BP. By this time, the brake pedal BP has been depressed by a certain degree, and the regenerative braking by the regenerative braking controller 74 has become large. This suppresses the feeling of strangeness which is brought to the driver.

If Step S6 determines that the friction braking is required or Step S2 determines that the regenerative braking is not required, the ECU 9 actuates the electric motor 40 to push the primary piston 10 according to the operation of the brake pedal BP, and performs regular control which generates hydraulic pressure in the master cylinder 2.

As described above, the regenerative coordination control without hydraulic pressure makes it possible to increase a regenerative braking amount during the regenerative coordination braking and suppress the feeling of strangeness which is brought to the driver.

According to the foregoing control contents, the primary piston 10 is held at the port closing position until the friction braking is required in Step S6. The control, however, is not limited to this, and may be performed as below. A relative position of the input rod 34 and the input piston 32 is detected from a detection value of the stroke sensor 62 and that of the resolver 60. If the jump-in clearance JC seems to become sere, the primary piston 10 is caused to move forward by actuating the electric motor 40 so that the reaction force of the spring 37 is not transmitted to the brake pedal BP.

According to the electric boosters 1 and 90 of the first and second embodiments, there are provided the primary piston 10, a distal side of which is located inside the master cylinder 2 and forms the compression chamber; the electric motor 40 which moves the primary piston 10; the input piston 32, 32', a distal end of which is located to face the compression chamber of the master cylinder 2, the input piston 32, 32' being placed to be axially displaceable relative to the primary piston 10; the spring 37, 37A which resiliently holds the input piston 32, 32' in the predetermined position as viewed in the axial direction of the input piston 32, 32' with respect to the primary piston 10; the input member 34, 93 which is disposed to be axially displaceable relative to the input piston 32, 32', further placed to be contactable with the input piston 32, 32' in a position facing the input piston 32, 32' in the axial direction, and moves back and forth by the operation of the brake pedal BP; and the rearward spring 80 (spring 80A; which applies the spring force to the input member 34, 93 in such a direction that the input member 34, 93 draws away from the input piston 32, 32'. The rearward spring 80 (spring 80A) is used to create the predetermined clearance JC between the input piston 32 and the input member 34, 93 when the brake pedal BP is not in operation.

The above-described configuration makes it possible to achieve the jump-in characteristics and increase the regenerative braking amount at the time of regenerative coordination braking.

A third embodiment of the invention will be described below with reference to FIGS. 15 to 17.

The present embodiment partially differs from the second embodiment, and therefore, only a relevant part will be illustrated in the following description. Components identical to those of the first or the second embodiment will be provided with the same reference marks (provided with a prime symbol "'", as needed), and only different components will be explained in details.

Figure 15:
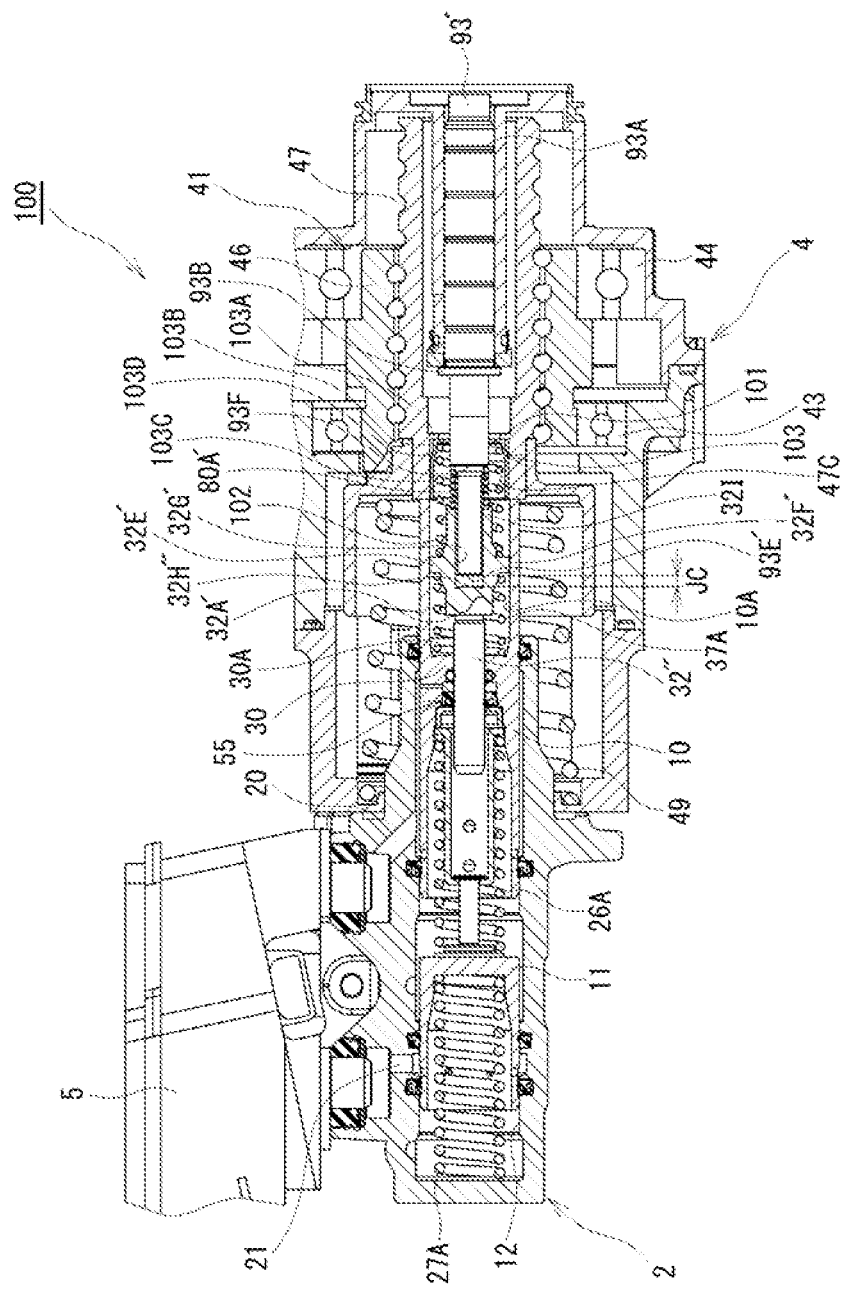
FIG. 15 is a longitudinal section of a relevant part of an electric booster according to a third embodiment of the invention.

As illustrated in FIG. 15, according to an electric booster 100 of the present embodiment, as in the first embodiment, a guide portion 32F' of an input piston 32" comes into contact with an inner wall 10A of the primary piston 10 to guide the input piston 32". A cylindrical spring receiving portion 32I is formed in a rear end portion of the input piston 32", and an aperture 32G' in the spring receiving portion 32I. A distal end portion 93E' of a plunger rod 93' is slidably inserted in the aperture 32G'. The distal end portion 93E' is contactable with a bottom 32H" of the aperture 32G'. A spring 80A' which is a helical compression spring is interposed between the distal end portion of the spring receiving portion 32I and a stepped portion 93F of the plunger rod 93' as the second spring device.

A spring 102 which is a helical compression spring is interposed between the spring receiving portion 32E' of the input piston 32" and a spring receiving flange 101 formed in the inner periphery of the screw shaft 47 which is a linear motion member, as the first spring device. A tubular spring receiving member 103 is attached to a distal end portion of the spring 102, which comes into contact with the spring receiving flange 101.

The input piston 32" is resiliently held by the springs 37A, 102 and 80A' in a neutral position shown in FIG. 15 as in the first embodiment. The springs 37A and 102 adjust the reaction force acting on the input rod 34 (brake pedal) when the input piston 32" and the primary piston 10 are relatively displaced. The spring 80A' biases the plunger rod 93' relative to the input piston 32" in such a direction that the plunger rod 93' draws away from the input piston 32". The spring 80A' thus secures the jump-in clearance JC between the bottom 32H" of the aperture 32G' of the input piston 32 and the distal end portion 93E' of the plunger rod 93' when braking is not applied.

The spring 80A is mounted on the plunger rod 93' in a fixed manner with an inner periphery of an end portion thereof resiliently interfitted with the stepped portion 93F side of the plunger rod 93'. With this configuration, the spring 80A draws away from the input piston 32" after coming into natural length when the input piston 32" moves in a direction away from the plunger rod 93'.

The springs 37A and 102 are placed in a lateral portion of the spring receiving portion 32E' of the input piston 32". Since an inner periphery of one end portion of the spring 102 is resiliently interfitted with the lateral portion" of the spring receiving portion 32E' of the input piston 32", the spring 102 is mounted on the input piston 32" in a fixed manner. The spring 102 is then movable with the input piston 32". The spring receiving member 103 is formed into a tubular shape so as to cover an outer periphery of the other end side of the spring 102. The spring receiving member 103 has an opening on one end side. The opening extends in a radially inward direction to be inserted with the plunger rod 93'. The spring receiving member 103 further includes a spring supporting portion 103A which is in contact with the spring receiving flange 101 of the screw shaft 47. Formed on an outer periphery side of the spring supporting portion 103A is an interfitted portion 103B, with which an outer periphery of the other end portion of the spring 102 is interfitted in a resilient manner. A guide portion 103C is formed on the other end side of the spring receiving member 103. The guide portion 103C has an external diameter larger than an external diameter of the interfitted portion 103B. An outer periphery side of the guide portion 103C comes into sliding contact with an inner wall 47C of the screw shaft 47. A tapered portion 103D is formed between the interfitted portion 103B and the guide portion 103C. The tapered portion 103D increases in diameter as the tapered portion 103D extends from the interfitted portion 103B toward the guide portion 103C. The inner wail 47C of the screw shaft 47 has an infernal diameter smaller than an internal diameter of the inner wall 10A of the primary piston 10. Because of the configuration described above, after the input piston 32" moves to the master cylinder 2 side with respect to the screw shaft 47 of the ball screw mechanism 41, and the spring 102 comes into natural length, the spring 102 and the spring receiving member 103 move with the input piston 32".

Since the electric booster 100 includes the spring 102, when the input piston 32" and the plunger rod 93' come into contact with each other (jump-in clearance=0 (zero)), the jump-in hydraulic pressure Pj generated in the primary chamber 16 is obtained by the following formula.

$$Pj=(k1+k2+k3)JC/S \quad (3)$$

where k1 designates a spring constant of the spring 37A;
k2 designates a spring constant of the spring 80A';
k3 designates a spring constant of the spring 102;
S designates a pressure-receiving area of the input piston 32" with respect to the primary chamber 16; and
JC designates the jump-in clearance.

The input (brake pedal force) Fj at the generation of the jump-in hydraulic pressure Pj is obtained by the following formula.

$$Fj=k2 \times JC \quad (4)$$

According to the formulae (3) and (4), gradient characteristics Pj/Fj of the input-output hydraulic pressures of the jump-in characteristics can be arbitrarily set on the basis of the spring constants k1, k2 and k3 of the springs 37A, 80A' and 102, the pressure-receiving area S of the input piston 32", and the jump-in clearance JC.

The following describes examples of operation of the electric booster 100. Concerning the operation of the electric booster 100, the jump-in and the regular boost are the same as in the first or the second embodiment, so that the description thereof will be omitted.

Figure 16:
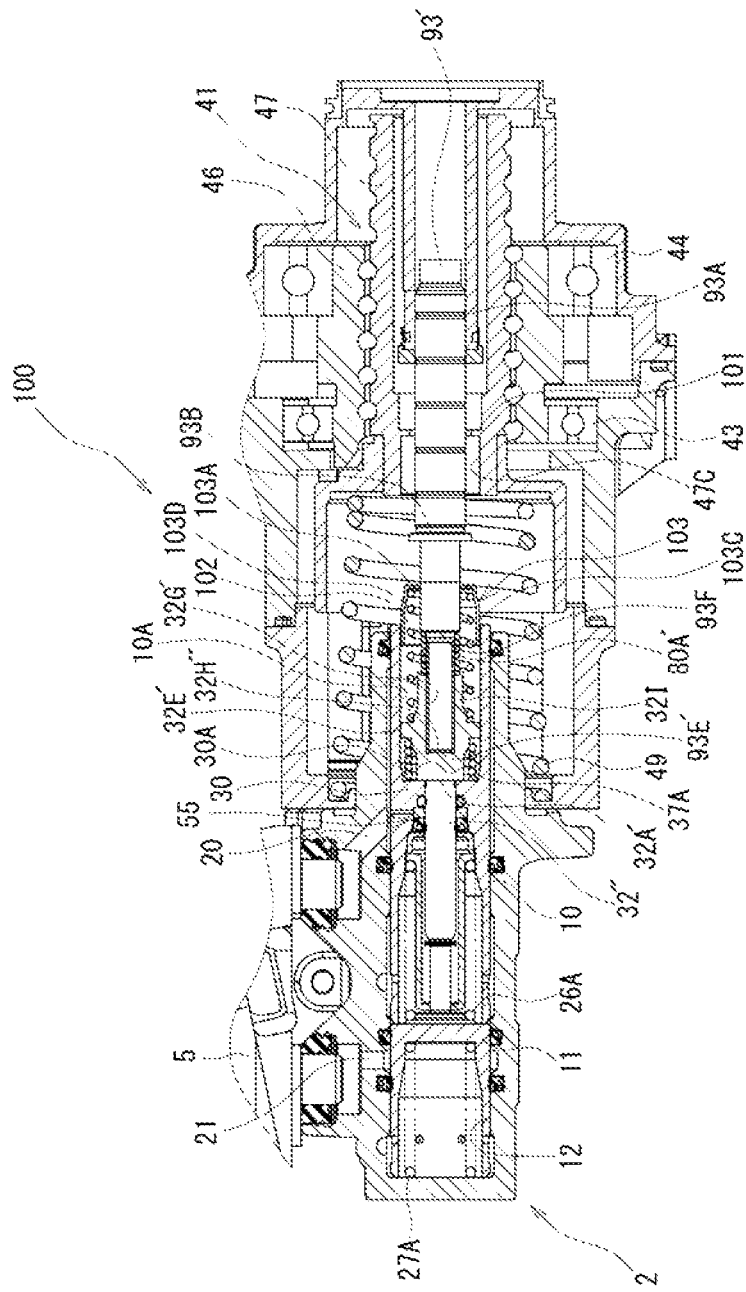
FIG. 16 is a longitudinal section of the relevant part of the electric booster of FIG. 15, showing a condition of the booster at the time of failure.

FIG. 16 shows a condition in which the electric motor 40 or the ECU 9 is failed. If the brake pedal BP is operated in such a condition to move the plunger rod 93' forward, the plunger rod compresses the spring 80A' and solves the jump-in clearance JC. After coming into contact with the bottom 32H" of the aperture 32G' of the input piston, the distal end portion 93E' of the plunger rod 93' pushes and moves the input piston 32". The input piston 32" moves forward while compressing the spring 37A. The stepped portion 32A' then comes into contact with the other side face 30A of the intermediate wall 30 of the primary piston 10, and pushes the primary piston 10 toward the master cylinder 2, to thereby generate the hydraulic pressure in the master cylinder 2.

At this time, the screw shaft 47 of the ball screw mechanism 41 does not move due to the failure of the electric motor 40 or the ECU 9. The primary piston 10 therefore moves forward, departing from the distal end of the screw shaft 47. This makes it possible to generate hydraulic pressure in the master cylinder 2 by depression of the brake pedal BP and thus perform the friction braking even in the case of failure of the electric motor 40 or the ECU 9. The spring 102 and the spring receiving member 103 attached in the fixed matter to the input piston 32" side move with the input piston 32", and draw away from the spring receiving flange 101 of the screw shaft 47 after the spring 102 comes into natural length. At this time, the guide portion 103C of the spring receiving member 103 is guided by the inner wall 10A of the primary piston 10, which suppresses oscillation of the other end of the spring 102 and thus suppresses occurrence of abnormal noises.

Since the interfitted portion 103B has a smaller external diameter than the guide portion 103C and is connected to the guide portion 103C with the tapered portion 103D interposed therebetween, when the input piston 32" moves rearward by release of the brake pedal BP, the spring receiving member 103 can be smoothly returned to the inner wail 47C of the screw shaft 47.

Figure 17:
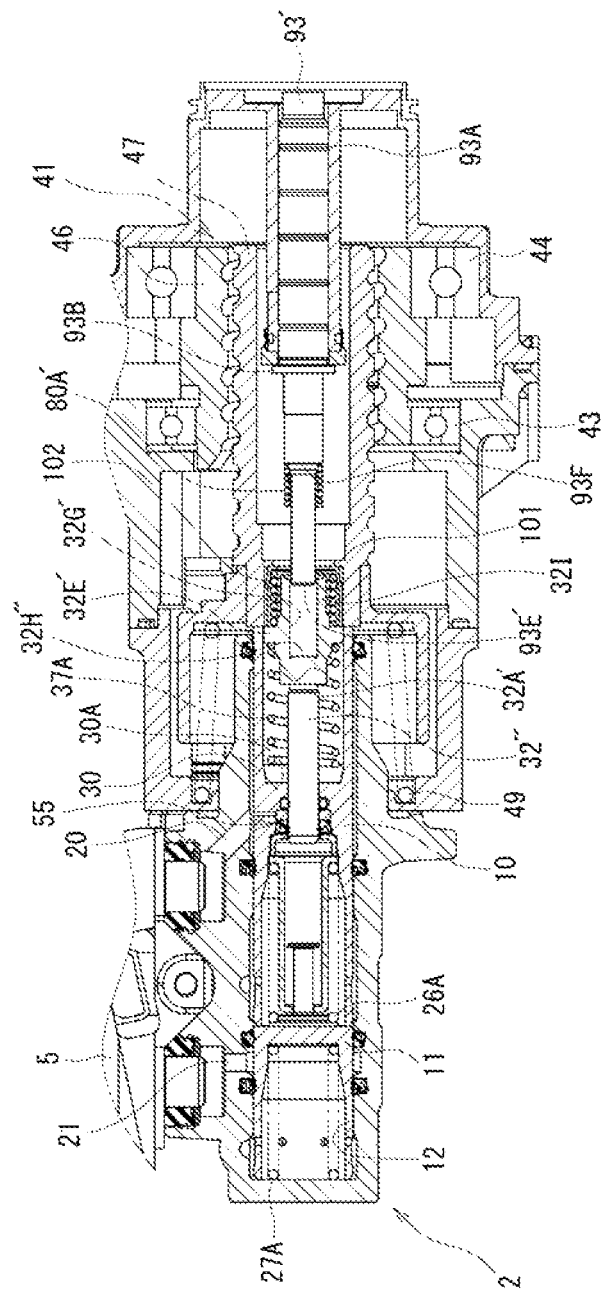
FIG. 17 is a longitudinal section of the relevant part of the electric booster of FIG. 15, showing an automatic braking condition of the booster.

When the electric motor 40 is actuated by a command of the ECU 9, not on the basis of operation of the brake pedal BP such as an automatic brake, the plunger rod 93' does not move forward, and only the screw shaft 47 of the ball screw mechanism 41 moves forward, as illustrated in FIG. 17. The screw shaft 47 pushes the primary piston 10 forward to generate hydraulic pressure in the master cylinder 2. The screw shaft 47 pushes the spring 102 through the spring receiving flange 101 with the spring receiving member 103 intervening therebetween, to thereby move the input piston 32" in the forward direction. As the result, not only the primary piston 10 but the input piston 32" generates the hydraulic pressure. At this time, the plunger rod 93' does not move, so that the brake pedal BP does not get involved. A distal end portion of the spring 37A, which is attached to the spring receiving portion 32E' of the input piston 32", draws away from the primary piston 10. A distal end portion of the spring 80A', which is attached to the stepped portion 93F of the plunger rod 93', draws away from the spring receiving portion 32I of the input piston 32".

Due to the configuration described above, the electric booster 100 provides the same operation and advantages as in the second embodiment. According to the electric booster 100, furthermore, the spring 102 is placed to cover the periphery of the spring 80A' to overlap with the spring 80A' in the axial direction. This enables the spring 102 to be added without increasing an axial dimension of the electric booster in contrast to the second embodiment.

Figure 18:
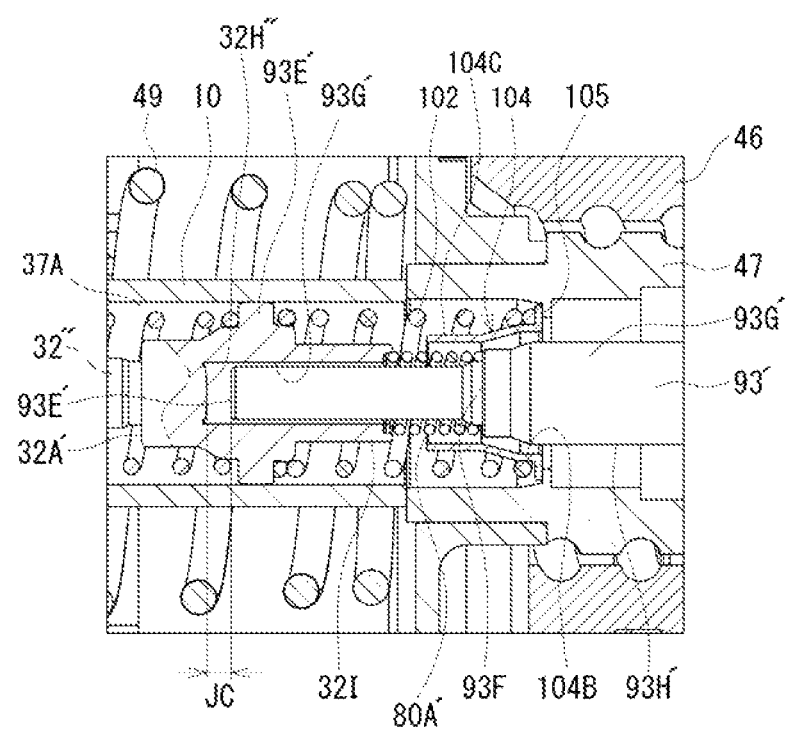
FIG. 18 is a longitudinal section of the relevant part of a modified example of the electric booster shown in FIG. 15.

A modified example of the third embodiment will now be described with reference to FIG. 18. Only difference between the modified example and the third embodiment is the spring receiving member attached to the spring 102. FIG. 18 therefore merely shows a relevant part. The following description will explain only different components from those of the third embodiment, and components identical to those of the third embodiment will be provided with the same reference marks.

As illustrated in FIG. 18, according to the modified example, a spring receiving member 104 is mounted on the inner periphery side of the spring 102. The spring receiving member 104 includes a flange 105 which is formed into a substantially cylindrical shape, supports the other end portion of the spring 102 at one end side thereof, and is in contact with the spring receiving flange 101 of the screw shaft 47. Formed on an inner periphery side of the flange 105 is an interfitted portion 104B, with which the inner periphery of the other end portion of the spring 102 is interfitted in a resilient manner. A guide portion 104C is formed on the other side of the plunger rod 93'. The guide portion 104C has an internal diameter smaller than an internal diameter of the interfitted portion 104B and larger than an external diameter of an intermediate portion 93G' of the plunger rod 93'. An inner periphery side of the guide portion 104C is contactable with an outer wall 93G' of the plunger rod 93'. The present modified example can provide the same operation and advantages as in the third embodiment. Since the spring receiving member 104 is placed on the inner periphery side of the spring 102, a connection between the spring 102 and the spring receiving member 104 is easily visible during assembly.

In the electric booster 100 of the third embodiment, the electric motor 40 functioning as an electric actuator uses the screw shaft 47 which is a linear motion member to push and propel the primary piston 10 which is a piston. The electric motor 40 includes, as the first spring device, the spring 37A which is the one spring biasing she input piston 32" wish respect to the primary piston 10, and the spring 102 which is the other spring biasing the input piston 32" with respect to the screw shaft 47. The spring 102 is placed to cover the outer periphery of the spring 80A' functioning as the second spring device.

Even after the spring 102 is added as the first spring device, the foregoing configuration makes it possible to suppress an increase in the axial dimension of the electric booster 100 and downsize the electric booster 100.

A fourth embodiment of the invention will now be described with reference to FIG. 19.

Components identical to those of the first embodiment will be provided with the same reference marks or provided with a three-digit mark in which "1" is added before the reference marks, as needed, and only different components will be explained in details. A drive mechanism of the nut member 46 of the ball screw mechanism 41 has the same configuration as the second embodiment, so that the same reference mark as the second embodiment will be used in the description below.

Figure 19:
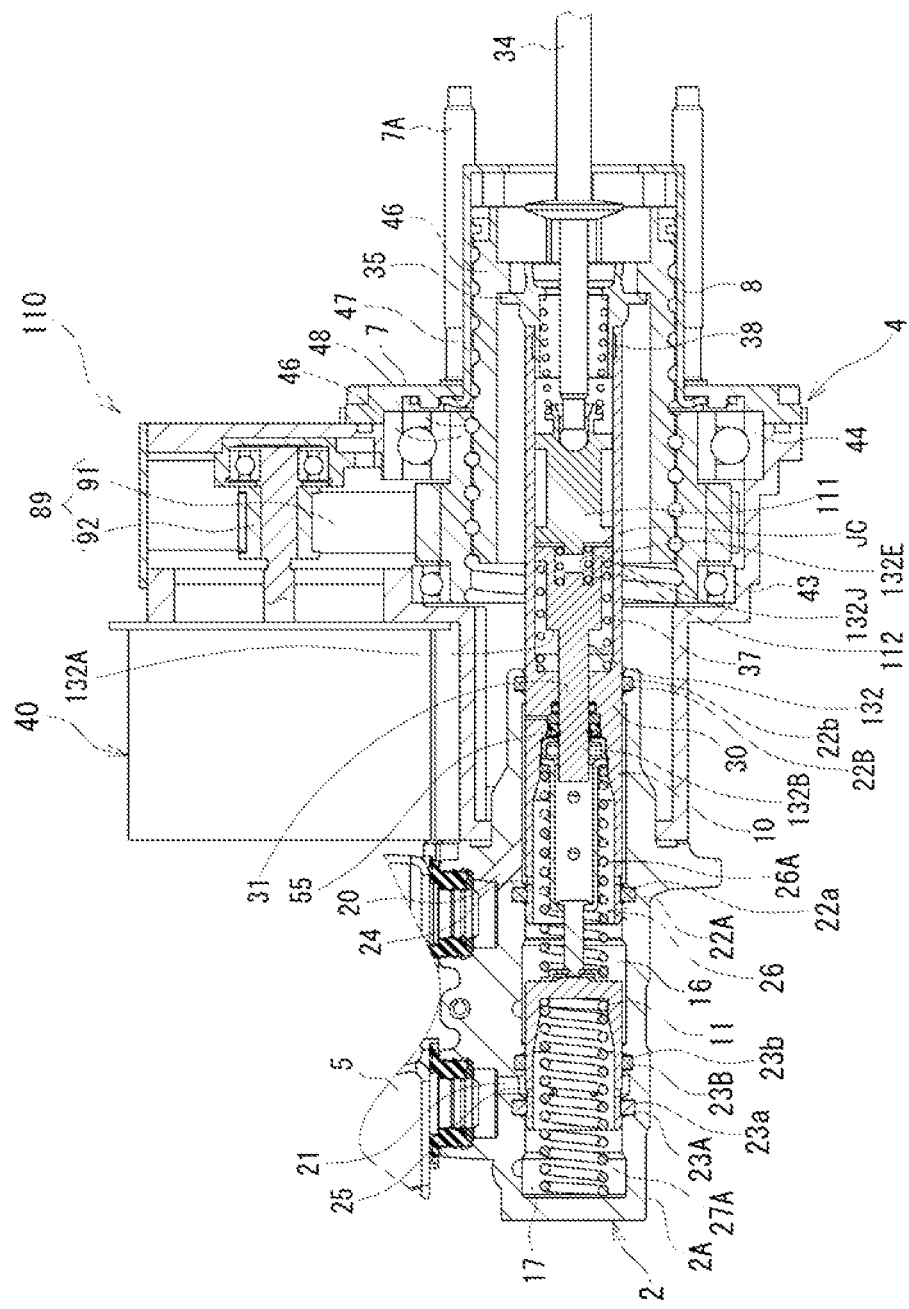
FIG. 19 is a longitudinal section of a relevant part of an electric booster according to a fourth embodiment of the invention.

As illustrated in FIG. 19, according to an electric booster 110 of the present embodiment, the electric motor 40 is placed outside the housing 4 and drives the nut member 46 by using a belt 91 and a pulley 92 forming a belt transmission mechanism 89, as in the second embodiment.

An input piston 132 is axially divided into two parts in a rear portion thereof. In other words, an input plunger 111 is interposed between the input piston 132 and the input rod 34, and the input rod 34 is coupled to an rear end portion of the input plunger 111. The input plunger 111 is guided movably in the axial direction within the cylinder portion of the rear portion of the primary piston 10. Although the input plunger 111 and the input rod 34 are coupled together so as to allow each other to incline to a certain degree, there is no axial interspace therebetween, so that the input plunger 111 and the input rod 34 move integrally with each other.

The spring 37 (one spring of the first spring device) is interposed between the intermediate wall 30 of the primary piston 10 and a spring receiving portion 132E formed in a rear end portion of the input piston 132. The spring 38 (the other spring of the first spring device) is interposed between the rear end portion of the input plunger 111 and the spring receiver 35 attached to the primary piston. A spring receiving recess 132J is formed in the rear end portion of the input piston 132. A jump-in spring 112 which is a helical compression spring as the second spring device is inserted in the spring receiving recess 132J. The jump-in spring 112 is interposed between the input piston 132 and the input plunger 111. The jump-in spring 112 is therefore located so that at least a part thereof as viewed in the axial direction coincides with an inner periphery side of the spring 37.

When braking is not applied as illustrated in FIG. 19, the spring 37 and the jump-in spring 112 are equal in set load. The jump-in clearance JC is formed between the input piston 132 and the input plunger 111.

In the present embodiment, the return spring 49 of the screw shaft 47 of the ball screw mechanism 41 is omitted from the description. The return spring 36 of the input piston 10 and the reaction force mechanism 81 are not provided.

Because of the foregoing configuration, as long as the jump-in clearance JC is maintained at the initial stage of braking, the reaction force caused by the hydraulic pressure acting from the primary chamber 16 onto the input piston 132 is not transmitted to the input plunger 111 and the input rod 34, which enables the jump-in characteristics to be obtained as in the first embodiment.

The jump-in hydraulic pressure Pj in this case is obtained by the following formula.

$$Pj=(k1+k3)JC/S$$

where k1 designates a spring constant of the spring 37; k3 designates a spring constant of the jump-in spring 112; S designates a pressure-receiving area of the input piston 132 with respect to the primary chamber 16; and JC designates the jump-in clearance.

Brake controls including boosting control, brake assist control, inter-vehicle distance control, and regenerative coordination control can be conducted by controlling the actuation of the electric motor 40, controlling propulsion of the primary piston 10 with respect to the stroke of the input rod 34, and adjusting the relative position of the input piston 132 and the primary piston 10. In this case, an adjustment amount of the relative position of the input piston 132 and the primary piston 10 can be set, regardless of size of the jump-in clearance JC. This increases a degree of freedom of control. Since the jump-in spring 112 is inserted in the spring receiving recess 132J of the input piston 132 to be located on the inner periphery side of the spring 37, the electric booster 110 can be reduced in axial dimension.

REFERENCE SIGNS LIST 1 electric booster
2 master cylinder
10 primary piston (piston)
32 input piston
34 input rod (input member)
37, 37A spring (first spring device)
38 spring (first spring device)
40 electric motor (electric actuator)
80 rearward spring (second spring device)
JC jump-in clearance (clearance)

The invention claimed is:

1. An electric booster comprising
a piston, a distal side of which is located inside a master cylinder and forms a compression chamber;
an electric actuator which moves the piston;
an input piston having a distal end located to face the compression chamber of the master cylinder, the input piston being placed to be axially displaceable relative to the piston;
a first spring that resiliently holds the input piston at a predetermined position in an axial direction of the input piston with respect to the piston;
an input member which is placed to be axially displaceable relative to the input piston, further placed to be contactable with the input piston and to face the input piston in an axial direction, the input member being capable of moving back and forth by brake pedal operation; and
a second spring which applies a spring force to the input member in a direction in which the input member is moved away from the input piston, wherein:
the first spring forms a first predetermined clearance between the input piston and the piston when the brake pedal is not in operation, the first predetermined clearance not being zero,
the first predetermined clearance being a regeneration clearance into which the primary piston can move rearward relative to the input piston during regenerative coordination control; and
the second spring forms a second predetermined clearance between the input piston and the input member when the brake pedal is not in operation, the second predetermined clearance not being zero.

2. The electric booster of claim 1, wherein when the input piston moves a predetermined distance toward the master cylinder relative to the piston, the input piston comes into contact with the piston and thus pushes the piston toward the master cylinder.

3. The electric booster of claim 1, wherein the second spring is placed so as to apply the spring force between the piston and the input member.

4. The electric booster of claim 2, wherein the second spring is placed so as to apply the spring force between the input piston and the input member.

5. The electric booster of claim 1, further comprising a controller which controls the electric actuator, wherein the controller activates the electric actuator by the brake pedal operation to move the piston; and
when the piston is displaced to a position before the displacement of the piston generates hydraulic pressure in the master cylinder, the controller controls the electric actuator so that the piston is held in the position by the electric actuator.

6. The electric booster of claim 1, wherein the second spring is placed so that at least a part of the second spring in the axial direction coincides with an inner periphery side of the first spring.

7. The electric booster of claim 6, wherein:
the electric actuator uses a linear motion member to push and propel the piston;
the first spring includes a third spring biasing the input piston with respect to the piston, and a fourth spring biasing the input piston with respect to the linear motion member; and the fourth spring is placed to cover an outer periphery of the second spring.

8. The electric booster of claim 1, wherein the input piston and the piston can be relatively displaced in forward and rearward directions along the axial direction in a separate position from the first predetermined clearance.

9. The electric booster of claim 8, wherein a relative displacement amount during regenerative coordination control which adjusts the piston rearward relative to the input piston is set to be larger than the second predetermined clearance.

10. The electric booster of claim 8, wherein the first predetermined clearance is set to be larger than the second predetermined clearance.

11. The electric booster of claim 1, wherein:
an input plunger coupled to the input member is placed between the input piston and the input member; and
the second spring is interposed between the input piston and the input plunger to form the second clearance between the input piston and the input plunger.

12. An electric booster comprising
a piston, a distal side of which is located inside a master cylinder and forms a compression chamber;
a rotation-linear motion conversion mechanism which converts rotation of an electric motor into linear motion and moves the piston;
an input piston having a distal end located to face the compression chamber of the master cylinder, the input piston being placed to be axially displaceable relative to the piston;
an input member which is placed to be axially displaceable relative to the input piston, further placed to be contactable with the input piston and to face the input piston in an axial direction, the input member being capable of moving back and forth by brake pedal operation;
a first spring that biases the input piston to a predetermined position in an axial direction of the piston with respect to the piston; and
a second spring which applies a spring force to the input member in a direction in which the input member is moved away from the input piston, wherein:
the first spring is placed so that one end of the first spring is in contact with the piston and that the other end of the first spring is in contact with the input piston, and the first spring forms a first predetermined clearance between the input piston and the piston when the brake pedal is not in operation, the first predetermined clearance not being zero,
the first predetermined clearance being a regeneration clearance into which the primary piston can move rearward relative to the input piston during regenerative coordination control; and
the second spring is placed so that one end of the second spring is in contact with the piston and the other end of the second spring is in contact with the input member, and forms a second predetermined clearance between the input piston and the input member when the brake pedal is not in operation, the second predetermined clearance not being zero.

13. The electric booster of claim 12, wherein when the input piston moves a predetermined distance toward the master cylinder relative to the piston, the input piston comes into contact with the piston and thus pushes the piston toward the master cylinder.

14. The electric booster of claim 12, further comprising a controller which controls the electric motor, wherein:
the controller activates the electric motor by the brake pedal operation to move the piston; and
when the piston is displaced to a position before the displacement of the piston generates hydraulic pressure in the master cylinder, the controller controls the electric motor so that the piston is held in the position by the electric motor.

15. An electric booster comprising
a piston, a distal side of which is located inside a master cylinder and forms a compression chamber;
an electric actuator which moves the piston;
an input piston placed to be axially displaceable relative to the piston;
an input member which is placed to be axially displaceable relative to the input piston, further placed to be contactable with the input piston and to face the input piston in an axial direction, the input member being capable of moving back and forth by brake pedal operation;
a first spring that resiliently holds the input piston at a predetermined position in an axial direction of the input piston with respect to the piston;
a second spring which applies a spring force to the input member in a direction in which the input member is moved away from the input piston; and
an input plunger placed between the input piston and the input member, and coupled to the input member, wherein:
the first spring forms a first predetermined clearance between the input piston and the piston when the brake pedal is not in operation, the first predetermined clearance not being zero,
the first predetermined clearance being a regeneration clearance into which the primary piston can move rearward relative to the input piston during regenerative coordination control; and
the second spring is interposed between the input piston and the input plunger, and forms a second predetermined clearance between the input piston and the input member when the brake pedal is not in operation, the second predetermined clearance not being zero.

16. The electric booster of claim 14, wherein when the input piston moves a predetermined distance toward the master cylinder relative to the piston, the input piston comes into contact with the piston and thus pushes the piston toward the master cylinder.

17. The electric booster of claim 14, further comprising a controller which controls the electric actuator, wherein:
the controller activates the electric actuator by the brake pedal operation to move the piston; and
when the piston is displaced to a position before the displacement of the piston generates hydraulic pressure in the master cylinder, the controller controls the electric actuator so that the piston is held in the position by the electric actuator.

* * * * *